United States Patent
Savage

(10) Patent No.: US 6,802,096 B2
(45) Date of Patent: Oct. 12, 2004

(54) RETRACTABLE FLOOR ASSEMBLY FOR A PASSENGER LOADING BRIDGE

(75) Inventor: John Savage, Gloucester (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/460,365

(22) Filed: Jun. 13, 2003

(65) Prior Publication Data

US 2003/0229955 A1 Dec. 18, 2003

Related U.S. Application Data

(60) Provisional application No. 60/388,365, filed on Jun. 14, 2002.

(51) Int. Cl.$^7$ ................................................. E01D 1/00
(52) U.S. Cl. ...................................................... 14/71.5
(58) Field of Search ................................. 14/69.5, 71.1, 14/71.3, 71.5, 71.7

(56) References Cited

U.S. PATENT DOCUMENTS

| | | | |
|---|---|---|---|
| 5,761,757 A | 6/1998 | Mitchell et al. | |
| 6,122,789 A | 9/2000 | Stephenson et al. | |
| 6,195,826 B1 | 3/2001 | LeBaron et al. | |
| 6,212,724 B1 | 4/2001 | Zhou | |
| 6,543,076 B1 * | 4/2003 | Worpenberg et al. | 14/71.5 |
| 6,691,361 B2 * | 2/2004 | Rolfe et al. | 14/71.5 |
| 2002/0100128 A1 | 8/2002 | Tholen et al. | |

FOREIGN PATENT DOCUMENTS

WO          02/28713    *  4/2002

* cited by examiner

*Primary Examiner*—Gary S. Hartmann
(74) *Attorney, Agent, or Firm*—Freedman & Associates

(57) ABSTRACT

Disclosed is an adjustable cab including an adjustable cab floor engagement assembly for use with a passenger loading bridge to service a plurality of different aircraft types, each different aircraft type having a different doorway configuration. The adjustable cab floor engagement assembly includes upper and lower floor members, which are moveable one relative to the other, to provide a plurality of different floor configurations. A light-weight, flip up panel is provided along a leading edge of the assembly, which pivots upwardly upon contact with a portion of the aircraft to avoid damaging either one of the assembly or the aircraft. The adjustable cab includes an auto-leveling structure to provide a level surface for passengers entering and exiting the aircraft.

17 Claims, 15 Drawing Sheets

RETRACTABLE FLOOR ASSEMBLY FOR A PASSENGER LOADING BRIDGE

This application claims the benefit of U.S. Provisional Application No. 60/388,365 filed Jun. 14, 2002.

FIELD OF THE INVENTION

The present invention relates generally to passenger loading bridges and more particularly to a cab floor assembly for use in passenger loading bridges for servicing commuter and conventional aircraft.

BACKGROUND OF THE INVENTION

In order to make aircraft passengers comfortable, and in order to transport them between an airport terminal and an aircraft in such a way that they are protected from the weather and other environmental influences, passenger loading bridges are used which can be telescopically extended and the height of which is adjustable. Passenger loading bridges in common use at airports today have a bubble section at their aircraft servicing end from which extends a small cab portion. The cab portion includes a floor that is generally continuous in its width, and which may be intermediately hinged to provide some horizontal adjustment when the cab is rotated at a high angle relative to the apron or ground. In many of today's passenger loading bridges the leading edge of the cab portion at the floor level is provided with a bumper for being positioned close to the aircraft that is being serviced. The bumper will either contact the aircraft or will be so close to the aircraft that it will close the gap between the aircraft and the bridge, so to prevent passengers and objects from falling therebetween.

A problem that is often encountered at airports is the need to provide bridge access to a variety of different aircraft types. For example, large commercial aircraft have significantly different door configurations compared to the door configurations that are found on smaller commuter-type aircraft. Given the existence of a number of aircraft manufacturers, each with their own particular aircraft doorway design, and the lack of a standardized configuration for the entry way of an aircraft, airport service personnel are confronted on a daily basis with the need to provide an access way to a number of aircraft doorway configurations and orientations with a single boarding bridge assembly.

In the case of large commercial aircraft, the door is opened typically by means of a lateral displacement of the door panel, for example the door may open by pivoting about an axis that is inclined slightly from vertical. More specifically, the pivot axis is inclined such that the door panel rises as it is being opened, thereby providing clearance between the lower edge of the door panel and the floor of the boarding bridge. Since the aircraft door does not come into contact with the floor structure of the passenger loading bridge during either the opening or closing procedure, boarding bridges have typically been constructed to define a planar floor element which is positioned elevationally below the door opening and positioned to extend outwardly from the doorway of the aircraft when the bridge is in a docked position.

Traditional boarding bridge designs include a substantially flat cab floor surface, which permits the door of a large commercial aircraft to be opened or closed subsequent to the bridge being abutted against or docked up to the aircraft. There are, however, some notable exceptions to this. For instance, with either one of a DC-9 and a MD-80 type aircraft, the door panel initially rises as it is being opened, and then subsequently descends to approximately 3 inches below the doorway sill height when fully opened. Accordingly, the lower edge of the door panel of a DC-9 type aircraft, including the MD-80 family of commuter jets, will contact the floor of a traditional passenger loading bridge. A prior art solution to this problem is to modify the cab floor of a passenger loading bridge that is to be used with DC-9 type aircraft to include a permanent depression or step-down. The depression provides clearance for the door panel to swing freely open without making contact with any part of the passenger loading bridge. Unfortunately, as will be obvious to one of skill in the art, the depression poses a potential hazard to passengers and employees as they move about within the cab. For instance, there is an increased likelihood that an individual may trip or stumble when walking on such an uneven floor surface.

In contrast to the large commercial aircraft, commuter aircraft oftentimes utilize a door assembly that pivots about a horizontal axis positioned at the lower end of the door. In some instances, the door of a commuter aircraft is fitted with a series of steps on its interior surface. In its open position the door defines a stairset that extends approximately to the ground level for accessing the aircraft or alternatively for deplaning from the aircraft. The fact that commuter aircraft doors pivot about a horizontal axis creates a number of complications for the operator of a conventional boarding bridge structure which has been designed for use with aircraft having doors that pivot about a vertical axis. For instance, the bridge operator is faced with the challenge of providing a floor system between the commuter aircraft and the main structure of the bridge. Furthermore, the stairset often includes a handrail. The handrail is moveable between a stowed position and an extended position after the stairset is deployed. This handrail provides a problem for the use of a passenger loading bridge, in that the handrail will extend several feet away from the fuselage of the aircraft and will block the bumper of the cab of the conventional boarding bridge from being driven right up next to the fuselage of the aircraft as is possible with large aircraft not equipped with the foldout stairs and handrail.

In U.S. Pat. No. 5,761,757 issued to Mitchell et al. on Jun. 9, 1998, disclosed is a dual-purpose passenger loading bridge capable of replicating the utility of a non-specialized passenger loading bridge for servicing larger commercial aircraft and also serving the special needs of commuter aircraft. The bridge includes a cab having a floor that is provided with a cutout portion for accommodating the stair components of a commuter aircraft, in particular the aircraft's handrail. A movable floor panel normally covers the cutout section to provide a level floor surface for servicing larger commercial aircraft. In addition, there is provided a movable bumper section that is stowed in a first fixed position to provide an approximately continuous bumper surface for engaging the fuselage of commercial aircraft. When a commuter aircraft is to be serviced the movable bumper section is displaced to a second position from its first position at the leading edge of the cab floor, and an actuator slides the movable floor panel laterally to expose the cutout portion of the cab floor. The bridge is mated to the aircraft doorway such that the stair components are accommodated within the cutout portion of the cab floor, for example the aircraft's handrail is positioned as far to the operator's right as is practicable. Finally, the movable floor panel is moved toward the aircraft's handrail within the cutout portion, such that the cutout portion is substantially covered.

In U.S. Pat. No. 6,195,826 issued to LeBaron et al. on Mar. 6, 2001, disclosed is an aircraft engagement assembly similar to the one that was described by Mitchell et al. Specifically, LeBaron et al. teach a sliding floor element that is associated with a length adjustable bumper subassembly. The engagement assembly allows the floor structure of the boarding bridge to be opened to provide a passageway for accommodating an opening or closing aircraft door, which opening is subsequently closed to provide an embarkation platform extending between the aircraft and the main structure of the boarding bridge.

Several disadvantages are associated with the systems of Mitchell and LeBaron. As will be obvious to one of skill in the art, neither system is suitable for servicing a DC-9 type aircraft wherein the lower edge of the door panel is substantially at the passenger loading bridge floor level. In particular, neither Mitchell nor LeBaron teach a passenger loading bridge for allowing the doorway of a DC-9 type aircraft to open freely. It is a further disadvantage of both systems that the movable floor panels slide laterally, thereby necessitating the placement of the cutout portion at the right side of the cabin in order to accommodate the placement of the aircraft's handrails. Accordingly, the cab portion extends forward along the side of the aircraft and the canopy may contact the aircraft fuselage about the cockpit glass, which is a delicate and irregularly shaped portion of the aircraft fuselage. Furthermore, commuter aircraft such as the Bombardier CR-J have Pitot tubes along the lateral surface thereof and ahead of the doorway, which are susceptible to damage resulting from contact with the passenger loading bridge canopy.

Zhou proposes a different solution in U.S. Pat. No. 6,212,724, issued Apr. 10, 2001. In particular, Zhou discloses a modified cab floor having flip up floorboards and an extendable floor panel. Unfortunately, the system of Zhou is not suitable for servicing a DC-9 type aircraft for the same reasons that have been discussed supra. Furthermore, the placement of the flip up floorboards gives rise to many of the same disadvantages that were described with reference to U.S. Pat. Nos. 5,761,757 and 6,195,826.

Tholen et al. in WO02/28713 disclose yet another system, which also fails to accommodate the doorway configuration of a DC-9 type aircraft. The assembly disclosed by Tholen et al. flips up about a horizontal pivot axis that is oriented along the rear edge thereof, to accommodate passage of a commuter aircraft stairway through the floor of the bridge, and then flips down again after the stairway is deployed to provide an embarkation platform. While the invention of Tholen is suitable for servicing large commercial aircraft, it is significantly less suitable for servicing commuter aircraft and not at all suitable for servicing DC-9 type aircraft. For example, the retractable floor assembly does not provide means for accommodating the lower edge of a DC-9 type aircraft door panel as it is opened and closed. Furthermore, the entire retractable floor assembly is hinged at a rear edge thereof. When such a heavy structure is made to rest against an aircraft fuselage, there is an increased likelihood that movement of the aircraft relative to the bridge will result in damage to at least one the aircraft and the floor assembly.

Stephenson et al. in U.S. Pat. No. 6,122,789 discloses a passenger loading bridge including a cab portion which can slide laterally and includes retractable floor members to allow a single bridge system to be used for both commuter and commercial aircraft. Unfortunately, the system of Stephenson et al. is not suitable for servicing a DC-9 type aircraft. In addition, the sliding cab portion is heavy, prone to mechanical failure and further complicates the task of aligning the cab to the aircraft fuselage in the first place.

It follows that there presently exists a need for an engagement structure for a passenger loading bridge that is capable of mating to larger commercial aircraft including the DC-9 type aircraft as well as smaller commuter aircraft such as the Bombardier CR-J. It is recognized that such an engagement structure should minimize safety concerns and the likelihood of damage occurring to the aircraft fuselage or stairset components. Such an engagement structure should provide flexibility and adaptability whereby the boarding bridge may be used to service aircraft having a variety of doorway constructions of various dimension, configuration, orientation and operation.

OBJECT OF THE INVENTION

In an attempt to overcome these and other limitations of the prior art it is an object of the instant invention to provide an engagement structure for a passenger loading bridge.

In an attempt to overcome these and other limitations of the prior art it is a further object of the instant invention to provide an engagement structure for a passenger loading bridge that is capable of mating to larger commercial aircraft as well as to smaller commuter aircraft.

SUMMARY OF THE INVENTION

In accordance with an aspect of the instant invention there is provided an adjustable engagement assembly for use in a passenger loading bridge having a frame defining a slot-like opening in a cab floor portion thereof, the adjustable engagement assembly comprising: an upper floor assembly for being disposed within the frame and defining a first floor surface at substantially a same height as the cab floor portion, the upper floor assembly including a first panel moveable between a first extended position in which the slot-like opening is substantially covered and a first retracted position in which a portion of the slot-like opening is exposed to define a notch at the height of the cab floor portion and along an aircraft engaging edge thereof; a lower floor assembly for being disposed within the frame in a spaced-apart, stacked arrangement with the first panel and including a second panel defining a second floor surface at a height lower than the height of the cab floor portion, the second panel moveable between a second extended position toward the aircraft engaging edge of the cab floor portion and a second retracted position away from the aircraft engaging edge of the cab floor portion; and, a drive structure mechanically associated with the first panel and with the second panel, the drive structure adapted for slidingly displacing the first panel between the first extended position and the first retracted position and for slidingly displacing the second panel between the second extended position and the second retracted position.

Additionally the invention teaches an adjustable engagement assembly for use in a passenger loading bridge having a frame, the adjustable engagement assembly comprising: an upper floor assembly for being disposed within the frame and defining a first floor surface, the upper floor assembly including a first panel moveable between a first extended position and a first retracted position; a lower floor assembly for being disposed within the frame in a spaced-apart, stacked arrangement with the first panel and including a second panel defining a second floor surface at a height lower than the height of the first panel, the second panel moveable between a second extended position and a second retracted position; and, a drive structure mechanically associated with the first panel and with the second panel, the drive structure for slidingly displacing the first panel between the first extended position and the first retracted position and for slidingly displacing the second panel between the second extended position and the second retracted position, such that in use the first and second panels are both retractable simultaneously and the second panel is extendable while the first panel remains other than extended.

In another embodiment of the invention there is disclosed an adjustable engagement assembly for use in a passenger loading bridge comprising: a fixed floor panel having a rear edge adapted for being mounted to the passenger loading bridge when in an installed condition, the fixed floor panel defining a first floor surface; a first moveable floor panel defining a second floor surface, the first moveable floor panel for slidable displacement relative to the fixed floor panel along a first path between an extended position in which the first floor surface is substantially uncovered by the first moveable floor panel and a retracted position in which the first floor surface is substantially covered by the first moveable floor panel; a second moveable floor panel mounted in a spaced-apart, stacked arrangement with the first moveable floor panel and disposed elevationally below the first moveable floor panel, the second moveable floor panel for slidable displacement along a second path generally parallel to the first path; and, a drive structure mechanically associated with the first moveable floor panel and with the second moveable floor panel, the drive structure for displacing the first moveable floor panel within the first path and for displacing the second moveable floor panel within the second path.

The invention is also described in an alternative embodiment in which an adjustable engagement assembly for use in a passenger loading bridge having a frame defining a slot-like opening in a cab floor portion thereof, the adjustable engagement assembly comprising: a fixed floor panel having a rear edge adapted for being mounted to the frame when in an installed condition, the fixed floor panel defining a first floor surface; a track assembly mounted within the slot-like opening, the track assembly including upper guide tracks mounted one each along opposing inner vertical surfaces of the slot-like opening and lower guide tracks mounted along same opposing inner vertical surfaces of the slot-like opening, one lower guide track mounted elevationally below and generally parallel to each upper guide track; a first slider plate defining a second floor surface and having opposite longitudinal edges for engaging the upper guide tracks when in an installed condition, the first slider plate being moveable within the upper guide tracks between a first extended position in which the first floor surface is substantially uncovered by the first slider plate and a first retracted position in which the first floor surface is substantially covered by the first slider plate; a second slider plate defining a lower floor surface and having opposite longitudinal edges for engaging the lower guide tracks when in an installed condition, the second slider plate being moveable within the lower guide tracks between a second extended position and a second retracted position; a drive structure mechanically associated with the first slider plate and with the second slider plate, the drive structure for displacing the first slider plate within the upper guide tracks and for displacing the second slider plate within the lower guide tracks.

In yet another embodiment of the invention there is described an adjustable engagement assembly for use in a passenger loading bridge having a cab section with an aircraft engaging edge, the adjustable engagement assembly comprising: a first floor member disposed adjacent the aircraft engaging edge of the passenger loading bridge, the first floor member moveable between a first extended position and a first retracted position along a first path that is substantially perpendicular to the aircraft engaging edge; a second floor member disposed for relative movement with the first floor member along a second path that is substantially parallel to the first path, the second floor member moveable between a second extended position and a second retracted position; and, a drive structure in communication with the first floor member and with the second floor member, the drive structure for displacing the first floor member between the first extended position and the first retracted position and for displacing the second floor member between the second extended position and the second retracted position.

In yet another embodiment of the invention there is described a floor support structure for an auto-leveling passenger loading bridge cab floor, the cab floor including a leveling floor section along an aircraft edge and a transitional floor section proximate an entry portal adjacent a tunnel structure of the passenger loading bridge, the floor support structure comprising: a generally cylindrical support member disposed substantially adjacent a lower surface of the leveling floor section, the generally cylindrical support member for supporting a teeter-totter motion of the leveling floor section to allow the leveling floor section to be adjusted to a substantially horizontal orientation; a mounting bracket secured to the lower surface of the cab floor, for engaging the generally cylindrical support member about a periphery thereof, such that the generally cylindrical support member simultaneously bears a weight of the cab floor supports the teeter-totter motion of the leveling floor section; and, an actuator in communication with a portion of the leveling floor section for elevationally changing the position of the portion of the leveling floor section, such that a second portion of the leveling floor potion disposed beyond the generally cylindrical support member moves in an approximately opposite direction.

The invention also describes a flip up door assembly for a passenger loading bridge, comprising: a panel having a leading edge, a rear edge and opposite longitudinal edges, the rear edge adapted for being pivotally supported along a horizontal axis adjacent a leading edge of a passenger loading bridge floor member such that when a lower surface of the panel proximate the leading edge of the panel contacts a portion of an aircraft being serviced by the passenger loading bridge, the panel pivots upwardly about the horizontal axis absent substantial damage occurring to the aircraft.

The invention is also described in terms of a method of mating a passenger loading bridge having an aircraft engaging end to a doorway of an aircraft selected from a group of different aircraft types, each different aircraft type having a known doorway configuration, including the steps of: positioning an upper floor member of the passenger loading bridge at a first predetermined position based upon the aircraft type; positioning a lower floor member of the passenger loading bridge at a second predetermined position based upon the same aircraft type; and adjusting the passenger loading bridge to move the aircraft engaging end in a direction toward the doorway of the aircraft.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1A:
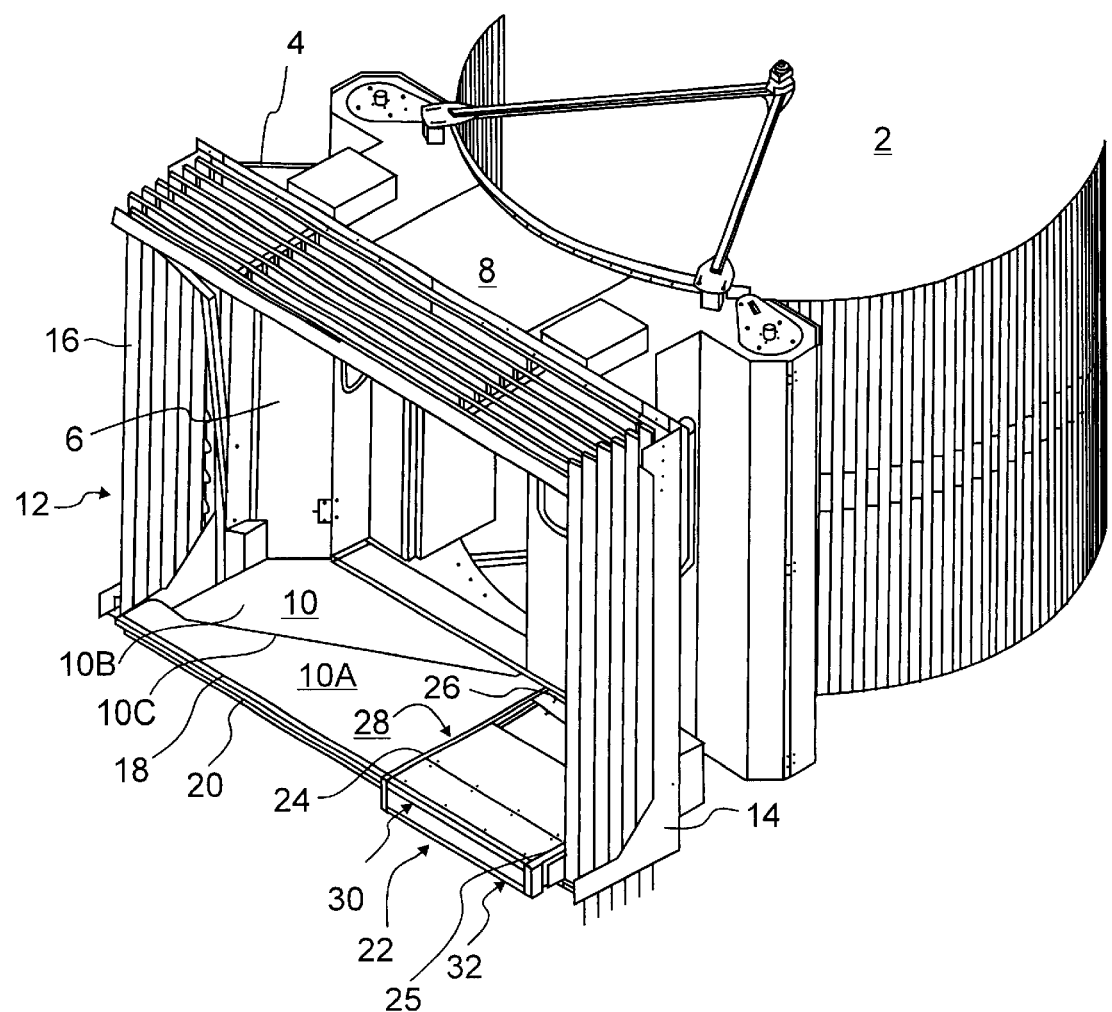
FIG. 1a is a partial elevated perspective view of a passenger boarding bridge fitted with the adjustable engagement assembly of the instant invention. The adjustable engagement assembly is shown in a closed condition.

Referring to FIG. 1a, shown is a partial elevated perspective view of a passenger loading bridge fitted with the adaptable cab floor assembly of the instant invention. The loading bridge 2 is fitted on its outer end with a cab 4. The cab 4 is a generally enclosed structure having a pair of opposingly positioned upstanding sidewalls 6 surmounted by a ceiling or roof element 8 extending between the two sidewalls. The cab 4 further includes a floor element 10. The floor element 10 extends between the two sidewalls. The cab defines an entryway from the main loading bridge structure. The cab 4 also defines an open portal 12 which is designed to interface with the fuselage of the aircraft to be serviced by the loading bridge. The portal 12 is defined by a framing structure 14 which extends upwardly from the floor 10 in a generally inverted U-shaped configuration. The portal frame 14 is fitted with a canopy structure, such as for instance a conventional accordion-like canopy 16.

The floor 10 is formed of two identifiable sections. A first floor section 10A, for example a leveling floor, and a second floor section 10B, for example a transitional floor, are interconnected to one another along the line 10C to form a hinge-like connection. This hinged connection permits the two floor sections to move independent of one another to accommodate uneven orientations of the two floor sections. The leading edge 18 of the first floor section 10A is optionally fitted with a bumper structure 20 as shown in FIG. 1a. The leading edge 18 is configured to be positionable adjacent the fuselage of an aircraft to be serviced by the cab floor assembly.

Figure 12:
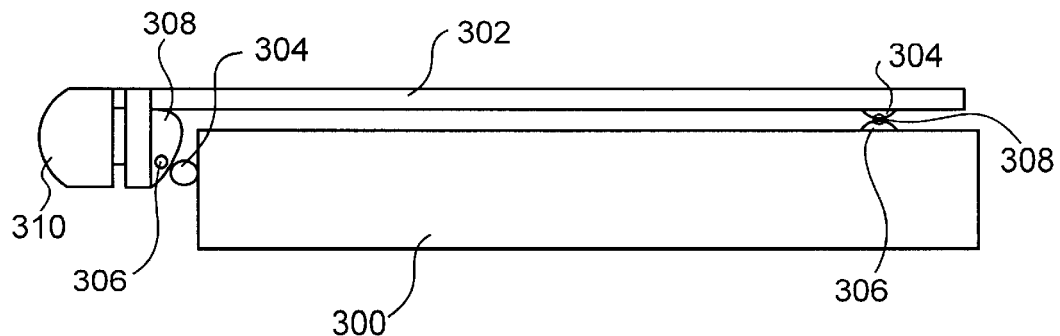
FIG. 12 is a side view of a prior art auto-leveling cab floor support structure, taken along the left side of the cab.

In a prior art cab floor structure, which is shown in side view in FIG. 12, a square cross-sectional tube 300 is provided horizontally along the underside of the cab floor 302. A bumper 310 is attached along a leading edge of the cab floor 302. The tube 300 is supported at one end by a portion of a not illustrated passenger boarding bridge main structure, and extends outwardly therefrom for supporting an aircraft engaging cab (not shown). The tube 300 is disposed approximately 3 inches below the floor 302, and is secured to the underside of the cab floor via pair of flange plates 308. A rod member 306 retains a spherical rod end bearing 304 within each flange plate 308. The tube 300 is biased toward the left side of the cab floor, as viewed from the passenger loading bridge. Accordingly, the tube 300 supports a weight of the prior art cab via the spherical rod end bearing 304, which supports a teeter-totter motion for leveling at least a portion of the cab floor 302. To this end, an actuator (not shown) is provided in communication with the cab floor 302 for moving the cab in the teeter-totter fashion. In this way, the prior art design of FIG. 12 supports leveling of the first floor section 10A to provide a substantially horizontal platform for passengers as they enter and exit the aircraft. It is a limitation of the prior art design of FIG. 12 that the axis of rotation about which the cab floor 302 rotates is disposed a distance below the cab floor 302, causing the cab to be displaced by a small amount in a transverse direction during auto-leveling. Furthermore, the actuator is disposed between the tube 300 and the left edge of the cab floor, such that the relatively longer right hand side of the cab floor is unsupported along the underside thereof, which results in a substantially flexible floor surface, and causing passengers to experience an unsettling "diving board effect". Furthermore, separate structures are required for bearing the weight of the cab, i.e. the tube 300, and for supporting rotation of the cab floor, i.e. the spherical rod end bearings 304. It is yet a further limitation that such spherical rod end bearings 304 support only a limited amount of rotation of the cab floor, which may be insufficient to provide a satisfactorily level the cab floor under some conditions of operation.

Figure 13:
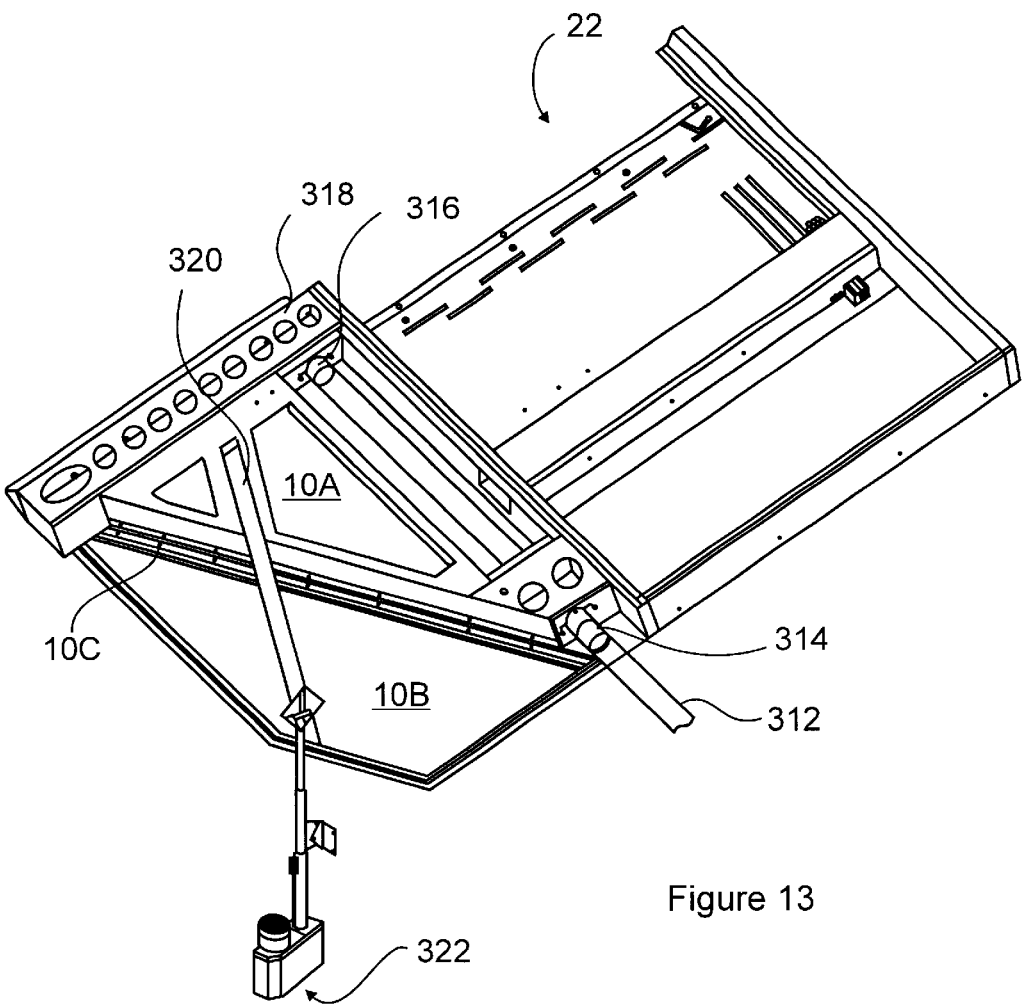
FIG. 13 is a view of the underside of an auto-leveling cab floor support structure according to the instant invention.
Figure 14:
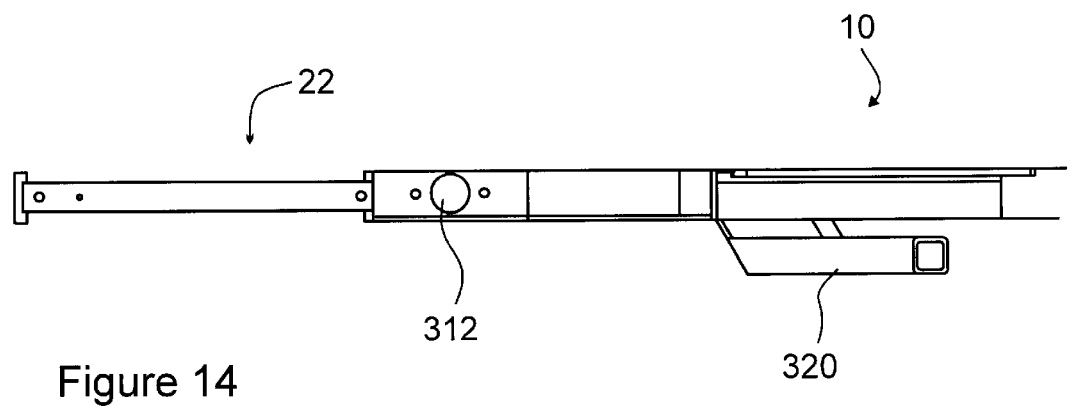
FIG. 14 is an end on view of the auto-leveling cab floor support structure of FIG. 13, taken along the rear edge of the cab.

Referring now to FIGS. 13 and 14, shown are lower and side views, respectively, of the cab floor according to the instant invention. Referring to FIG. 13, a circular cross-section tube 312 supports a weight of the cab 4 and additionally acts as a fulcrum to provide a point about which the cab floor 10 may be rotated in a teeter-totter manner to provide a substantially horizontal floor section 10A for passengers as they enter and exit the aircraft (not shown). The circular tube 312 passes through and is retained by a first bracket 314 and a second bracket 316 at the rear and leading edges of the cab floor frame 318, respectively. In fact, the tube 312 also passes through structural cross tubes supporting the cab floor section 10A. The tube 312 is biased toward the left side of the cab floor, as viewed from the passenger loading bridge. Advantageously, the tube 312 is disposed at substantially a same height as the cab floor, as shown most clearly in FIG. 14. Furthermore, the brackets 314 and 316 provide a more stable mounting system compared to the prior art system of FIG. 12. An actuator 322 is in communication with the first floor section 10A via an actuator arm 320. The actuator arm engages the first floor section 10A between the tube 312 and a right edge of the cab floor 10, i.e. such that the relatively longer right hand side of the cab floor is supported along the underside thereof, which reduces the "diving board effect" described above with reference to the prior art system of FIG. 12.

Referring again to FIG. 1a, a slot or recess opening 22 in the floor 10 is defined generally by a right side plate 24 secured to the left edge of the floor section 10A, an end plate 26 secured to the floor section 10A, and a left side plate 25 secured to the floor section 10A. In the illustrated embodiment, this slot 22 is shown as a quadrilaterally configured void adjacent to the floor structure 10A. It should be understood that this slot 22 may be of any number of different configurations and shapes and furthermore may be positioned at any number of locations in the floor structure proximate the leading edge 18 of the floor structure. In the instant illustration the slot is shown on the left side of the cab (as viewed from the passenger loading bridge 2). The slot 22 may also be on the right side of the cab, in the middle region of the cab or any other location along the leading edge 18 of the floor 10.

The instant invention provides an adjustable engagement assembly 28 which may be introduced into the aforesaid slot 22 in various configurations to form an embarkation platform over the slot 22 from an aircraft positioned adjacent to that slot 22. As shown in greater detail in FIG. 2, the adjustable engagement assembly 28 includes an upper floor assembly shown generally at 30 and a lower floor assembly shown generally at 32. The upper floor assembly 30 and the lower floor assembly 32 are in a spaced apart, stacked arrangement, with the lower floor assembly 32 positioned elevationally below the upper floor assembly 30. When the adjustable engagement assembly 28 is positioned within the slot 22, the upper floor assembly 30 defines an upper surface configured to provide a walking surface for passengers exiting or entering the aircraft. The adjustable engagement assembly 28 preferably includes a lower cover 51.

Figure 2:
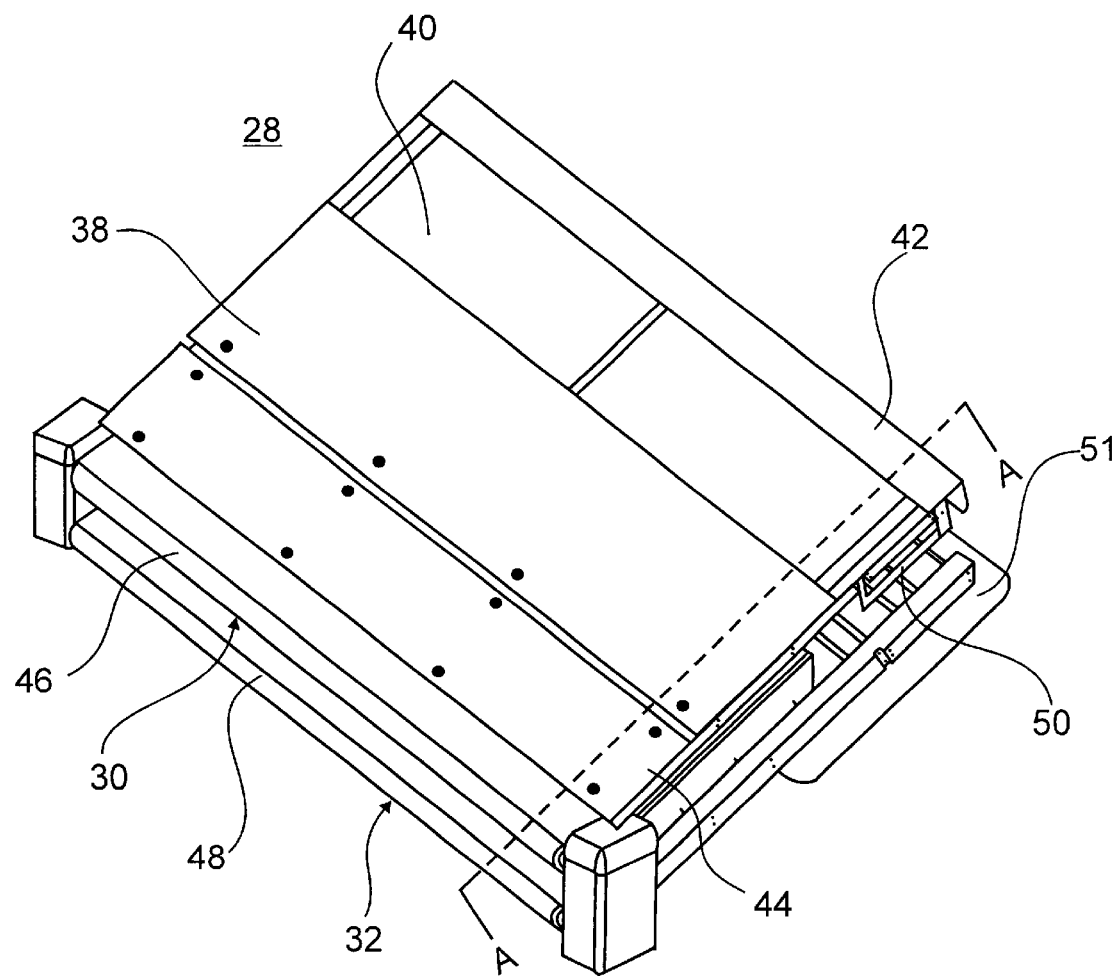
FIG. 2 is a view of the adjustable engagement assembly in a removed condition.

Referring still to FIG. 2, the upper floor assembly 30 includes a pop up floor portion including a pop up floor plate 42. The pop up floor plate 42 is pivotally mounted to the adjustable engagement assembly 28 via pivot arms 50 located one each near opposite ends of the pop up floor plate. The upper floor assembly 30 further includes a fixed floor subassembly 40, a heated sliding floor subassembly 38 and a heated flip up door subassembly 44. Optionally, the heated sliding floor subassembly 38 is replaced by a non-heated sliding floor subassembly and the heated flip up door subassembly 44 is replaced by a non-heated flip up door subassembly, for instance when the bridge is operated in a warm climate. Each subassembly will be discussed in greater detail, below. Optionally, the leading edge of the flip-up door subassembly 44 is fitted with a bumper structure 46. Further optionally, a non-skid surface is provided along the upper surfaces of the heated sliding floor subassembly 38 and the heated flip up door subassembly 44, for example by applying a self adhesive paper or spraying with a non-skid paint, to provide improved traction under adverse conditions. Still further optionally, the lower floor assembly 32 includes a bumper structure 48 along a leading edge thereof.

Figure 3:
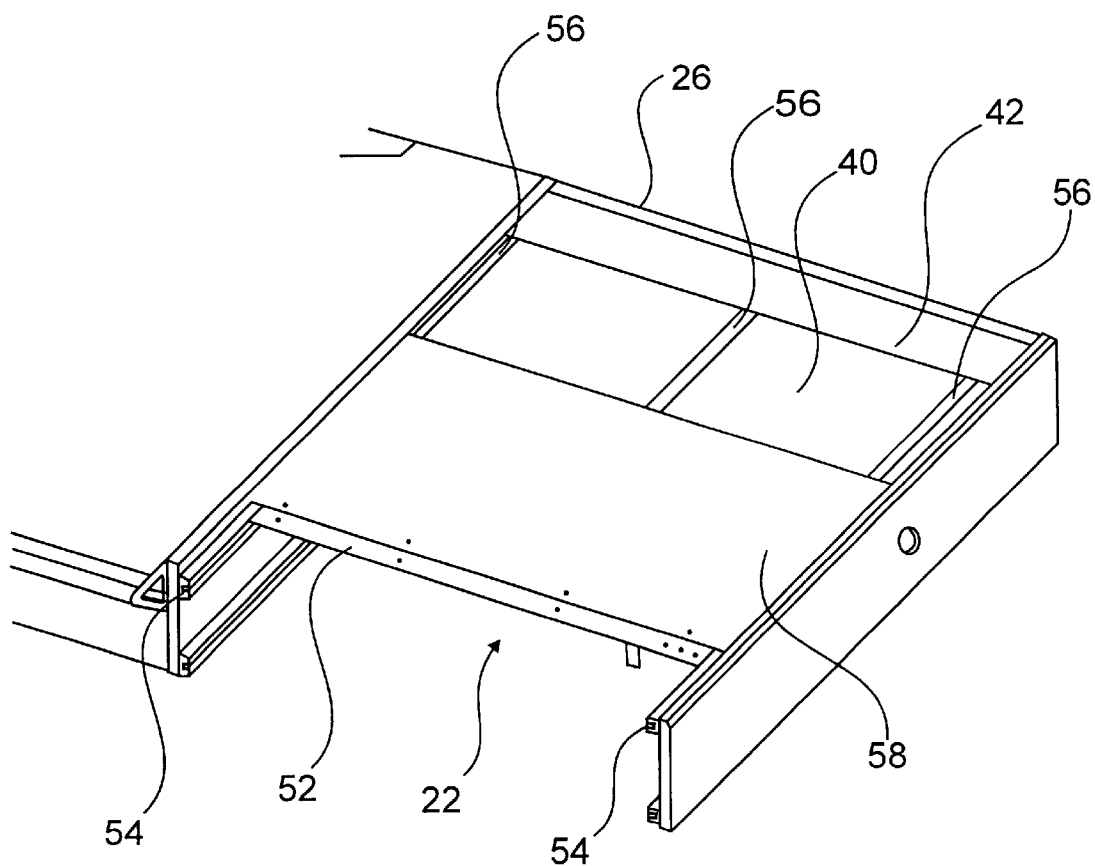
FIG. 3 is a partial elevated perspective view of the adjustable engagement assembly upper surface with some of the upper floor assembly components removed for clarity.
Figure 4:
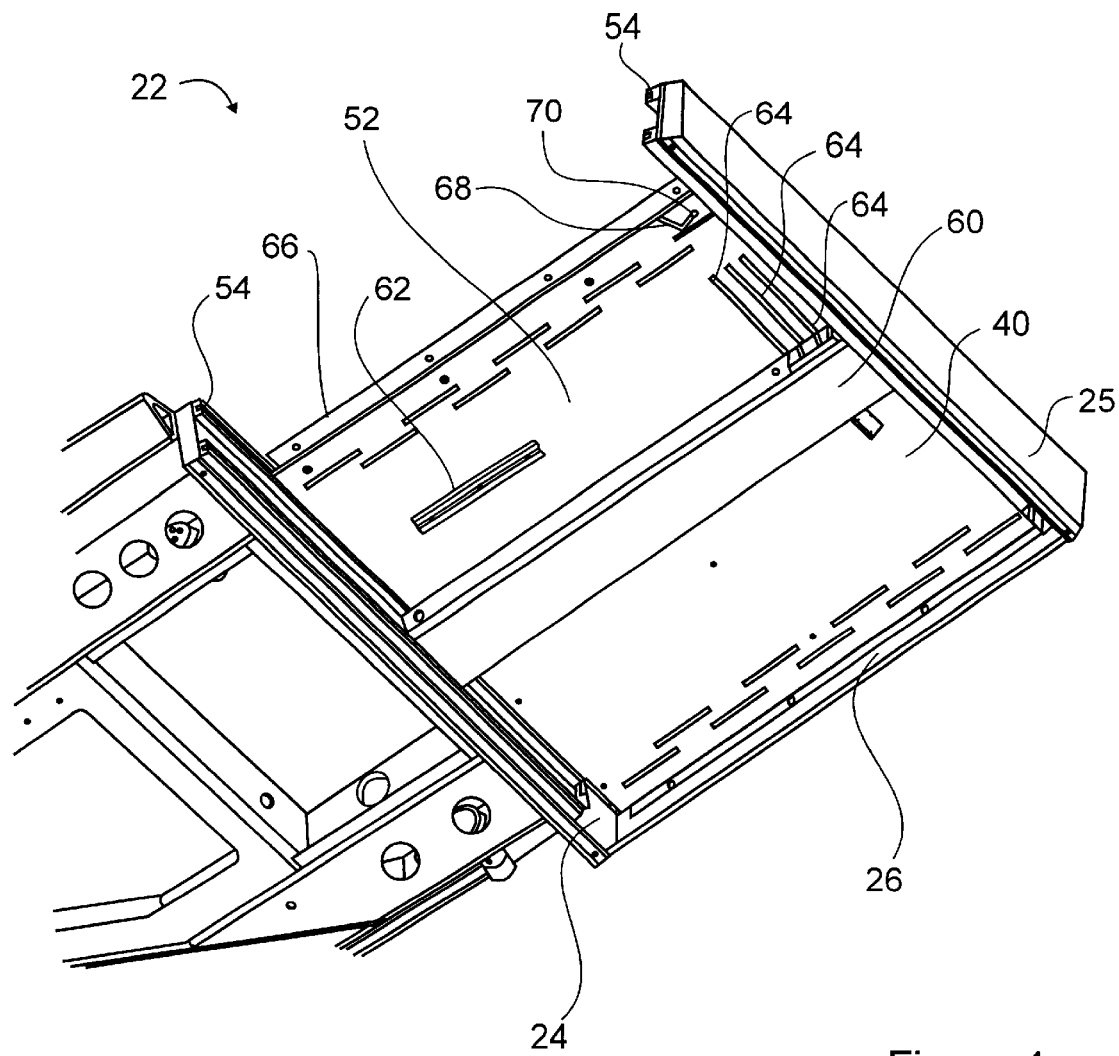
FIG. 4 is a view of the underside of the adjustable engagement assembly with some components removed for clarity.

Referring to FIGS. 3 and 4, shown are partial views of the upper floor assembly 30 with some elements removed for clarity. The elements of the upper floor assembly are shown in a supported condition within the slot 22. In particular, an upper guide track 54 is fixedly mounted one each along two opposing inner vertical longitudinal surfaces of the slot 22. The upper guide tracks 54 are mounted at a height along said opposing vertical surfaces such that the walking surface defined by the upper floor assembly 30 is substantially elevationally continuous with the adjacent floor structure 10A. The upper guide tracks 54 support a sliding motion of the heated sliding floor subassembly 38 in a direction substantially normal to the leading edge 18 of the floor structure 10A.

The upper floor assembly 30 includes the pop up floor plate 42 which is disposed adjacent the end plate 26 of the slot 22. An upper slider plate 52 is supported at opposite longitudinal edges thereof by upper guide tracks 54. The fixed floor subassembly 40 is mounted from the top, being slid rearward within the slot 22 such that the rear edge thereof passes under the pop up floor plate 42 and abuts the end plate 26. As shown in FIG. 4, the rear edge of the fixed floor subassembly 40 is secured to the end plate 26 using suitable fasteners. Optionally, the fixed floor subassembly is secured via welding or other suitable means. The rear edge of the upper slider plate 52 is disposed elevationally below and supports the leading edge of the fixed floor subassembly 40. The fixed floor subassembly 40 is dimensioned to provide a clearance space between each opposite longitudinal edge thereof and an adjacent one of the upper guide tracks 54. The clearance space is to accommodate the pivoting motion of the pop up floor plate pivot arms 50.

The fixed floor subassembly 40 further includes at least a runner 56, preferably a plurality of such runners, mounted on the upper surface thereof and aligned substantially along the direction of the upper slider plate 52 motion. Optionally, additional runners are provided parallel and adjacent to the leading edge of the fixed floor subassembly 40. The at least a runner 56 supports the lower surface of a heated sliding floor plate 58 that is mechanically coupled to the upper slider plate 52. Together, the heated sliding floor plate 58 and the upper slider plate 52 forms the heated sliding floor subassembly 38. The heated sliding floor plate 58 and the upper slider plate are in a spaced apart stacked arrangement with sufficient separation provided between the lower surface of the heated sliding floor plate 58 and the upper surface of the upper slider plate 52 to accommodate the fixed floor subassembly 40 therebetween. For instance, shims (not shown)

are positioned between the heated sliding floor plate 58 and the upper slider plate 52 to obtain a free running fit.

Referring now to FIG. 4, a track 62 is mounted along the lower surface of the upper slider plate 52 in a direction substantially parallel to the leading edge 18 of floor section 10A. The track is for engaging an actuator (not shown) for effecting a sliding motion of the heated sliding floor subassembly 38 within the slot 22. Limit switches 64 are disposed along the lower surface of the upper slider plate 52 for arresting the sliding motion of the heated sliding floor subassembly 38 at predetermined positions. For instance, in the illustrated embodiment three limit switches are provided for supporting the fully extended position, the partially retracted position and the fully retracted position of the heated sliding floor subassembly 38. A hinge 66 is mounted along the leading edge of the heated sliding floor subassembly 38 for supporting the not illustrated heated flip up door subassembly 44. Also mounted along the leading edge of the heated sliding floor subassembly 38 is a switch 68. The switch 68 includes an adjustable bolt 70 for engaging a surface of the not illustrated flip up door subassembly 44. The adjustable bolt 70 is adjusted such that the switch is activated when the flip up door subassembly is in a normal operating condition, for example, when the flip up door subassembly is substantially co-planar with the heated sliding floor subassembly 38. When the flip up door subassembly flips up out of the co-planar condition, the switch 68 forms an open circuit and movement of the loading bridge 2 is arrested.

A cross conduit 60 contains and routes electrical wires, for example wires for powering not illustrated heating elements within the heated floor subassemblies and for powering an actuator (not shown).

Figure 5:
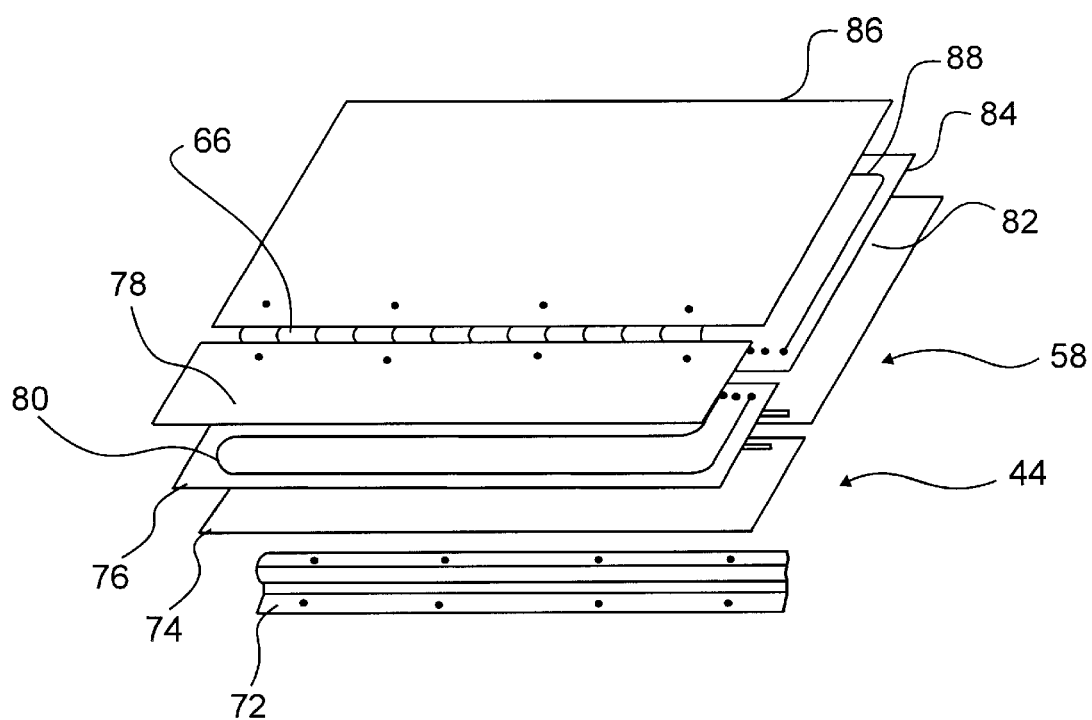
FIG. 5 is an exploded view of the heated sliding floor plate including a flip up door assembly.

Referring now to FIG. 5, shown is an exploded view of the flip up door subassembly 44 and the heated sliding floor plate 58. The heated flip up door subassembly 44 includes a bumper retainer 72 which is plug welded to a flip up door belly plate 74, which is bonded to a flip up door heater grid 76 and a flip up front plate 78 to form a sandwiched layer member in the form of the flip up door assembly 44. Heat trace cable 80 is routed through the flip up door heater grid 76, which forms the center of the sandwich, before the layers are bonded. The layers are bonded using one of epoxy between layers, sheet thermoset glue between layers and plug welding layers with seal weld around edges. The heated sliding floor plate 58 includes a floor belly plate 82, which is bonded to a floor heater grid 84 and a floor plate 86 to form a sandwiched layer member in the form of the heated sliding floor plate 58. Heat trace cable 82 is routed through the floor heater grid 84, which forms the center of the sandwich, before the layers are bonded. The layers are bonded using one of epoxy between layers, sheet thermoset glue between layers and plug welding layers with seal weld around edges. The flip up door assembly 44 is hingedly mounted to the heated sliding floor plate 58 via the hinge 66.

Figure 6:
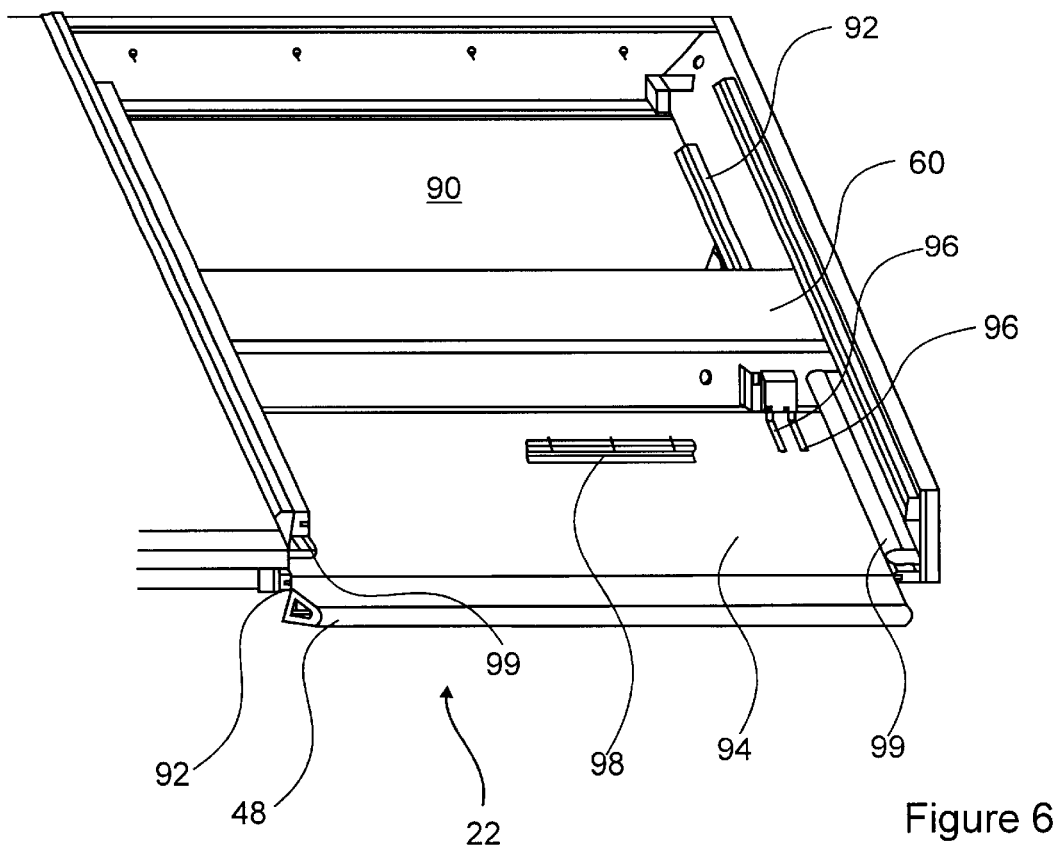
FIG. 6 is a partial elevated perspective view of the upper surface of the lower floor assembly within the adjustable engagement assembly.

Referring now to FIG. 6, shown is a partial view of the upper surface of the lower floor assembly 32 with some elements removed for clarity. In particular, the lower cover 51 is absent in FIG. 6, such that the area 90 rearward of the cross conduit 60 is open. The lower floor assembly 32 includes a lower slider plate 94 that is supported at opposite longitudinal edges thereof by lower guide tracks 92. Accordingly, the lower slider plate 94 is moveable in a manner similar to that of the upper slider plate 52. A track 98 is mounted along the upper surface of the lower slider plate 94 in a direction substantially parallel to the leading edge 18 of floor section 10A. The track is for engaging an actuator (not shown) for effecting a sliding motion of the lower slider plate 94 within the slot 22. Limit switches 96 are adjusted for supporting a fully extended position of the lower slider plate 94 and a fully retracted position of the lower slider plate, for instance a 15 inch retraction. Also shown in FIG. 6 are sensing edges 99, one each disposed intermediate and generally parallel to the upper guide track 54 and the lower guide track 92. The sensing edges 99 are for sensing contact between the adjustable engagement assembly 28 and the stairset of a commuter aircraft, when said stairset is accommodated within the slot 22. For instance, the sensing edges send a signal upon contact for sounding an alarm and/or moving the bridge away from the sensed contact and/or arresting the motion of the bridge.

Figure 7:
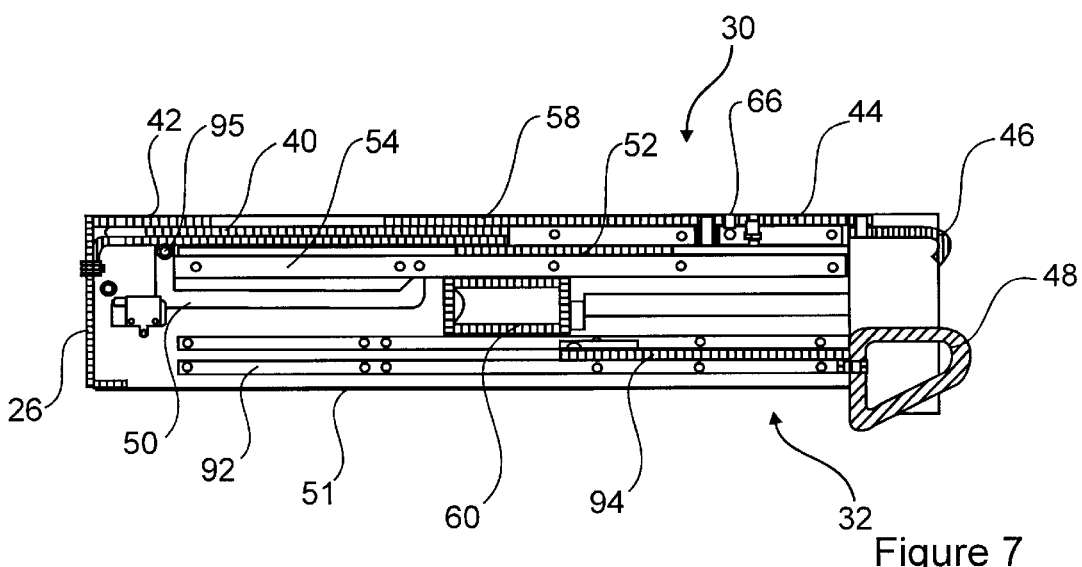
FIG. 7 is a longitudinal cross sectional view of the adjustable floor assembly taken along the line A—A in FIG. 2.

Referring now to FIG. 7, shown is a longitudinal cross section of the adjustable floor assembly taken along the line A—A in FIG. 2. In addition, the end plate 26 and cross conduit 60 of the cab floor 10 are shown. FIG. 7 illustrates more clearly the arrangement of the various components of the adjustable engagement assembly 28. The rear edge of the fixed floor assembly 40 is secured to the end plate 26, whilst the leading edge of the fixed floor assembly 40 is sandwiched between the heated sliding floor plate 58 and the upper slider plate 52. The leading edge of the heated sliding floor plate 58 and the leading edge of the upper slider plate 52 are flush one to the other; however, the rear edge of the upper slider plate extends further rearward than does the rear edge of the heated sliding floor plate. Preferably, the rear edge of the upper slider plate 52 forms approximately a 45° angle downward and toward the rear of the adjustable engagement assembly 28. The angled edge is for engaging a roller shaft 95 mounted along the inner vertical surface of each pivot arm 50. As the upper slider plate 52 moves rearward within upper guide tracks 54, the roller shaft 95 is forced upward and onto the upper surface of upper slider plate 52, thereby pivoting the pop up floor plate 42 upwards to accommodate the rearward motion of the heated sliding floor plate 58. Accordingly, the rearward motion of the upper slider plate 52 causes the pop up floor plate 42 to pop up automatically. Furthermore, notches (not shown) are optionally provided one each along the opposite longitudinal edges of the upper slider plate 52 for accommodating the roller shaft 95, thereby allowing the pop up floor plate 42 to settle on top of the heated sliding floor plate 58 to provide a more level walking surface.

Figure 8:
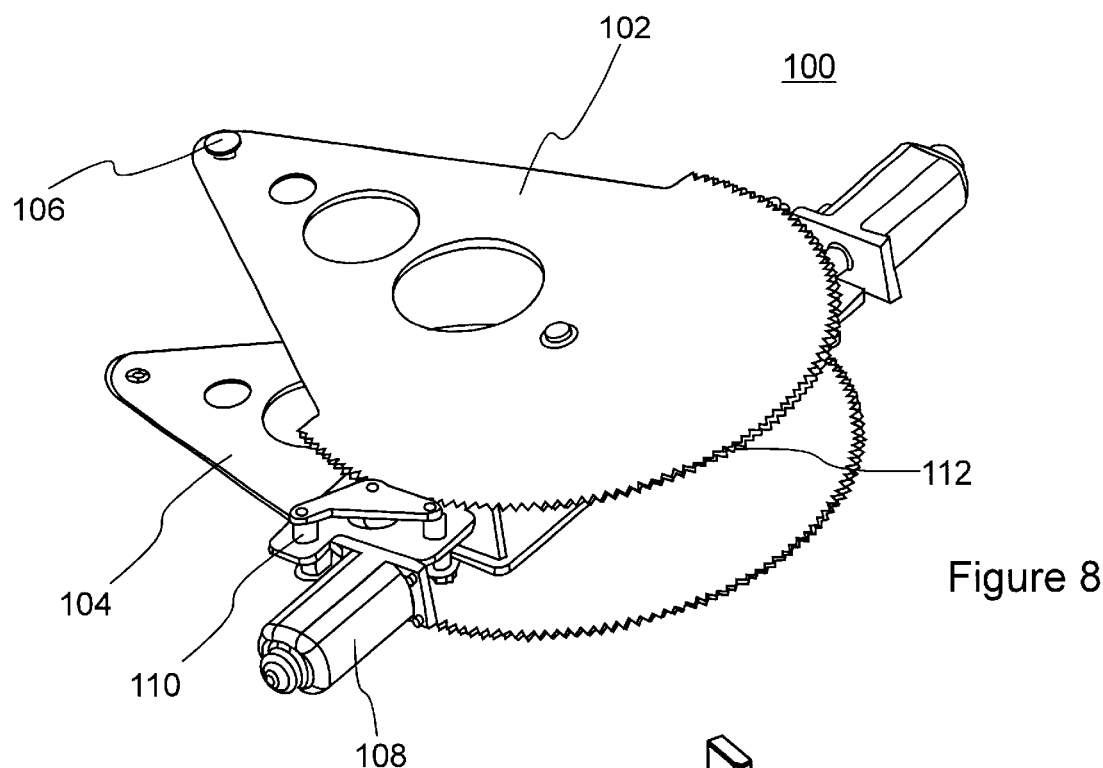
FIG. 8 is a perspective view of an actuator assembly for moving the top and lower floor panels within the adaptable cab floor assembly.

FIG. 8 is a view of an actuator assembly for moving the upper slider plate 52 and the lower slider plate 94 within the slot 22. The actuator assembly 100, for example a sector actuator, includes upper and lower actuator sectors 102 and 104, respectively. The upper and lower actuator mountings are symmetrical and interchangeable, and will be described herein with reference only to the upper actuator mounting, for the sake of brevity. The upper actuator sector includes a track pin 106 for engaging the track 62 mounted to the lower surface of the upper slider plate 52. The actuator assembly 100 further includes a motor 108 in mechanical communication with a toothed portion 112 about the periphery of the upper actuator sector 102 via a motor nose support assembly 110.

Figure 9:
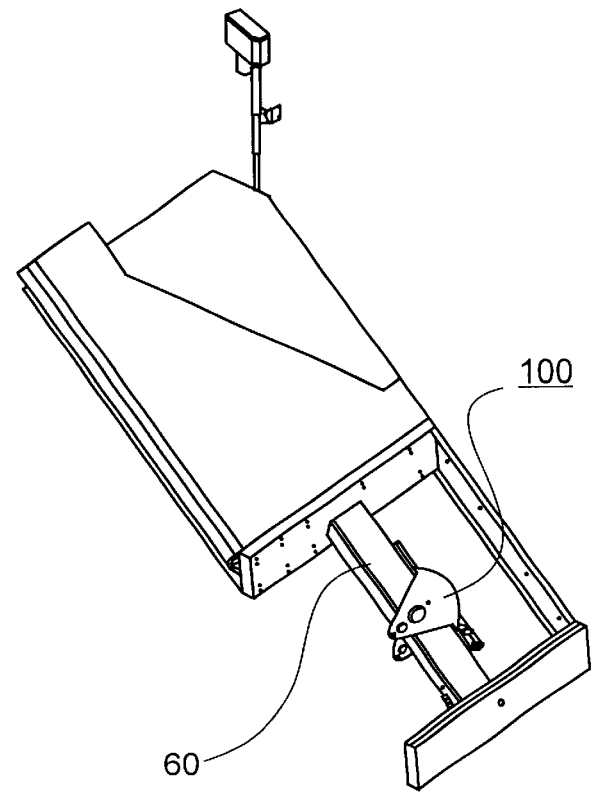
FIG. 9 is a view of the actuator assembly within the recess opening of the cab floor and with the floor panel portions removed for clarity.

Referring now to FIG. 9, shown is the actuator assembly 100 of FIG. 8 in an installed condition. The actuator assembly 100 is mounted to the cross conduit 60 via an actuator bracket assembly (not shown).

Figure 10:
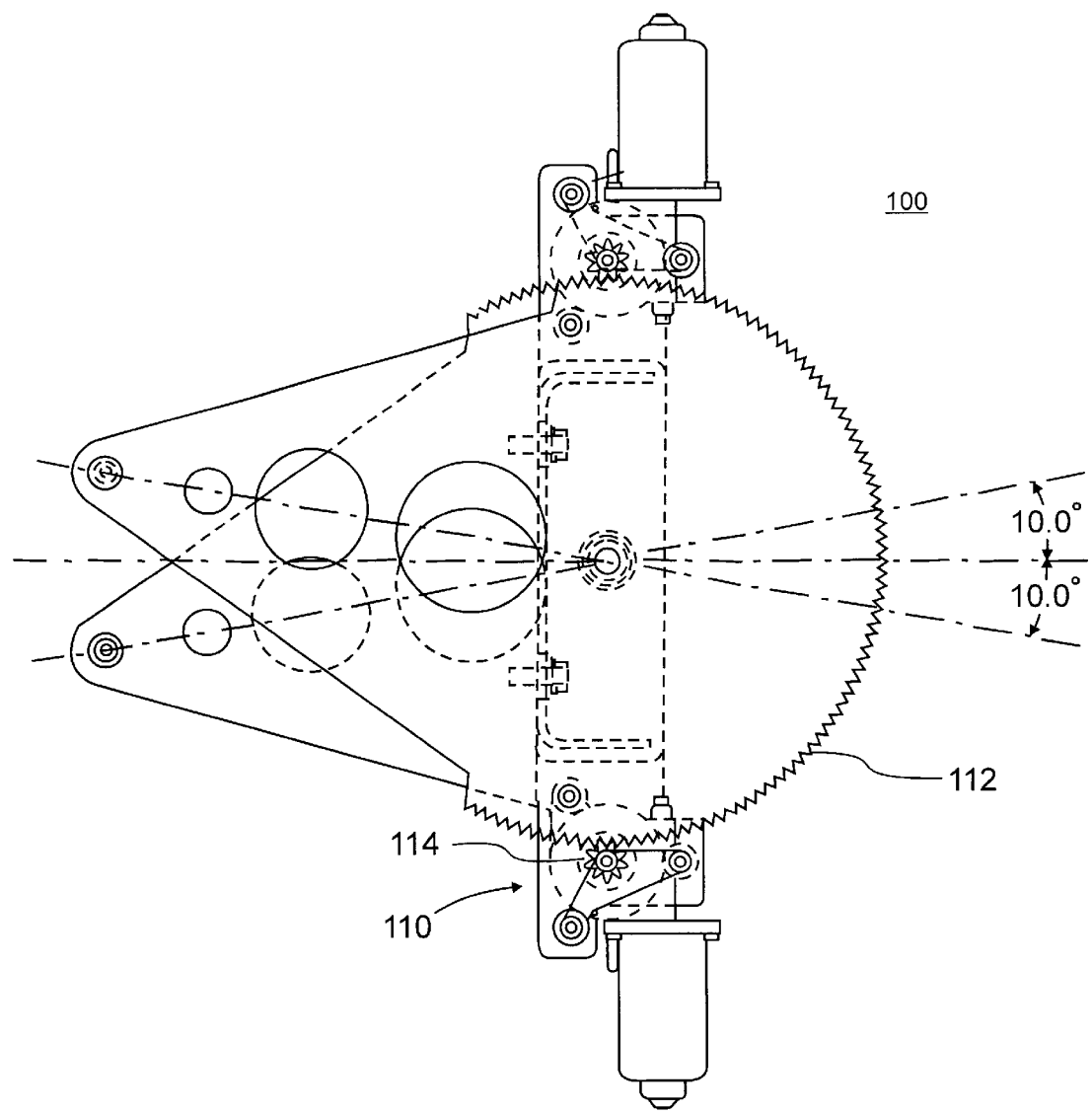
FIG. 10 is a plan view of the actuator of FIG. 8.

As shown in FIG. 10, the upper actuator sector 102 is configured to be 10° clockwise off the centerline in the fully extended position, and to rotate in a clockwise direction to retract the upper slider plate 52. Similarly, the lower actuator sector 104 is configured to be 10° counter-clockwise off the centerline in the fully extended position, and to rotate in a counter-clockwise. direction to retract the lower slider plate 94. An inter-engaging structure 114 associated with the motor nose support assembly 110 transfers power from the motor 108 to the upper actuator sector 102, to thereby rotate the upper actuator sector 102 for extending or retracting the upper slider plate 52.

Optionally another type of actuator is used to slide the upper slider plate 52 and/or the lower slider plate 94 within the slot 22. Other actuators envisaged for use with the instant invention include one of a pneumatic and a hydraulic piston and plunger type actuator and an electromechanical screw-type actuator. Further optionally a system of pulleys and cables with an electric motor is used to slide the upper slider plate 52 and/or the lower slider plate 94 within the slot 22. It is also envisaged to use a single actuator for moving both the upper and the lower sliding plates. Optionally, separate actuators are provided for moving each slider plate independently of the other.

The operation of the adjustable engagement assembly 28 for servicing a plurality of different aircraft types will be described with reference to FIGS. 1a to 1c. FIG. 1a illustrates the adjustable engagement assembly 28 in a fully extended condition. Such a fully extended condition is envisaged for use with large commercial aircraft of the type having doors that open by pivoting about a substantially vertical axis. As was discussed above, the door pivot axis of such aircraft is inclined slightly from the vertical, such that the door panel rises as the door is opened and the lower edge of the door panel does not contact the floor structure of the passenger loading bridge. Accordingly, the upper floor assembly 30 is moved into a fully extended position such that the bumper structure 46 along the flip up door subassembly 44 is substantially continuous with the bumper structure 20 along the leading edge 18 of floor section 10A. Advantageously, the cab 4 presents a continuous floor surface for mating to the aircraft fuselage, which facilitates formation of a weather-tight seal.

It is a further advantage of the instant invention that, when a larger commercial aircraft is being serviced, the slot 22 is completely covered and the bumper structure 46 forms a seal with the fuselage to form a fire barrier. Of course, optionally the lower floor assembly 32 is placed into the fully extended position to form a second seal with the aircraft fuselage, thereby providing increased fire protection. Further optionally, a conduit in communication with a fire-retardant foam source is directed into the space between the upper floor assembly 30 and the lower floor assembly 32 to discharge foam within said space in the event of a fire beneath the cab 4. One of skill in the art will appreciate that passengers are more likely to exit the aircraft in an orderly fashion if they are prevented from seeing flames raging below on the tarmac beneath the slot 22.

Figure 1B:
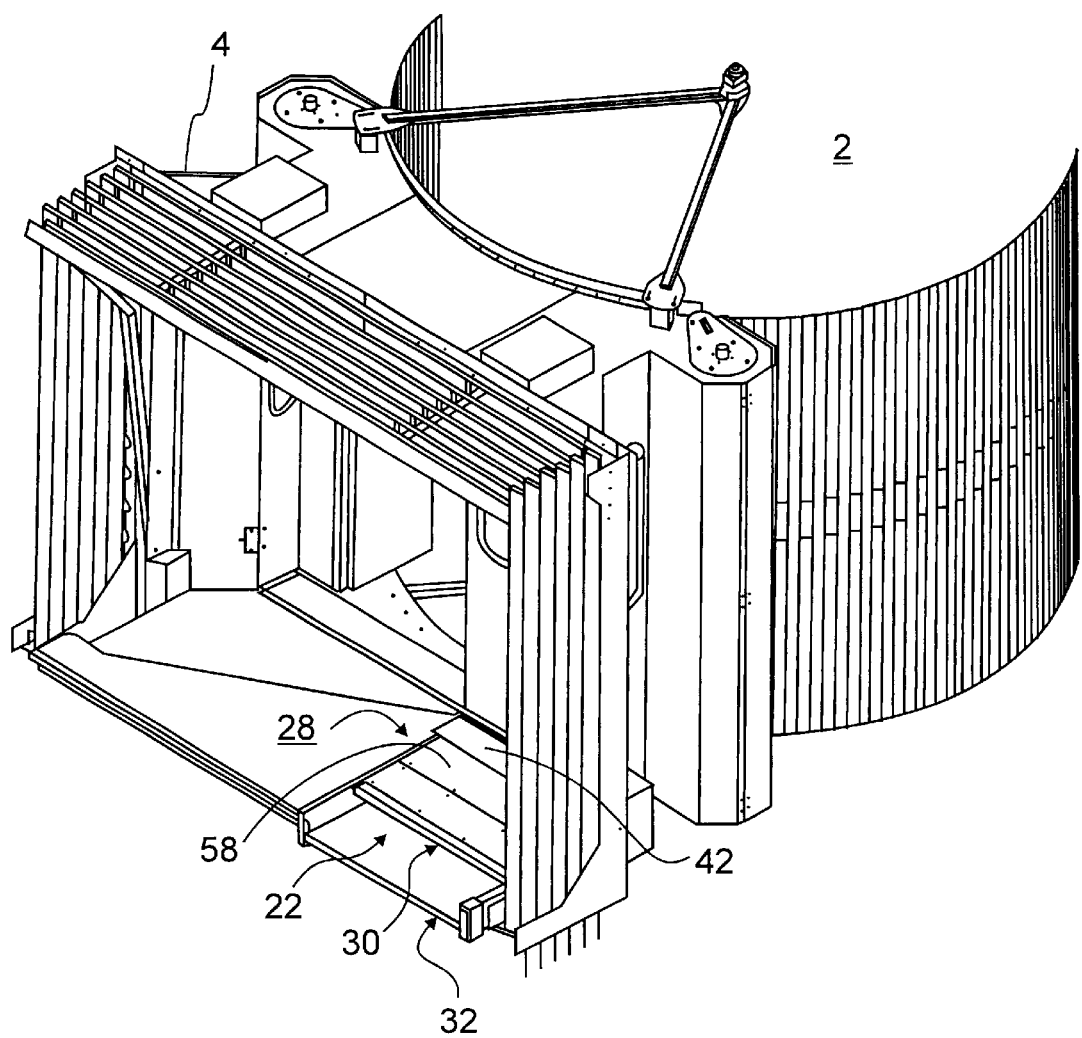
FIG. 1b is a partial elevated perspective view of a passenger boarding bridge fitted with the adjustable engagement assembly of the instant invention. The adjustable engagement assembly is shown in a DC-9 type aircraft servicing condition.

Referring now to FIG. 1b, shown is a partial elevated perspective view of a passenger loading bridge fitted with the adjustable engagement assembly 28 of the instant invention. The adjustable engagement assembly 28 is shown in FIG. 1b in a DC-9 type aircraft servicing condition. As discussed above, the DC-9 type aircraft presents a unique problem in that the door panel opens by pivoting about a substantially vertical axis and then drops down to about 3 inches below the doorway sill height when in the fully open position, which causes the door panel to make contact with the floor of the conventional passenger loading bridge. The adjustable engagement assembly 28 according to the instant invention solves this problem by providing an upper floor assembly 30 that may be moved into a fully retracted position for providing a slot to accommodate the lower edge of the DC-9 type aircraft doorway in the fully open position. For instance, the passenger loading bridge 2 is moved into engagement with the fuselage of a DC-9 type aircraft such that the adjustable engagement assembly 28 is disposed within the aircraft door-opening path. The operator then presses a switch to retract the upper floor assembly 30 by approximately 15 inches. In the fully retracted position, the rear edge of the heated sliding floor plate 58 is displaced rearward toward the pop up floor plate 42. The upper slider plate 52, which is simultaneously moving rearward within upper guide track 54, makes contact with the roller shafts 95 of the pop up plate pivot arms 50, forcing the roller shafts 95 upward and onto the upper surface of the upper slider plate 52. In this way, the pop up plate 42 is displaced upwardly to accommodate passage of the heated sliding floor plate 58. With continued rearward motion of the upper slider plate 52, the roller shafts 95 settle into notches provided along the opposite longitudinal edges of the upper slider plate. Accordingly, the pop up floor plate comes to a rest position on top of the heated sliding floor plate 58, as shown in FIG. 1b.

Of course, optionally the upper floor assembly 30 is retracted by approximately 15 inches prior to the passenger loading bridge 2 being moved into engagement with the fuselage of the DC-9 type aircraft. Advantageously, the space that is vacated by the upper floor assembly 30 accommodates the aircraft door panel in the fully opened position. Further advantageously, the slot 22 is completely covered by the lower floor assembly 32 and the lower cover 51, and the bumper structure 48 along the leading edge of the lower floor assembly 32 has formed a seal with the fuselage of the DC-9 type aircraft to form a fire barrier. The lower floor assembly is constructed to satisfy local fire regulations and to protect passengers and employees moving about the cab 4 during a fire. In addition to providing fire protection, the lower floor assembly also prevents objects from falling through the slot 22 and onto the tarmac below the loading bridge 2. The lower floor assembly 32 is disposed at a sufficient distance below the upper floor assembly 30 to allow a door at the height of the upper floor assembly to pass above the lower floor assembly without making contact therewith, but generally insufficient to result in serious injury due to a fall from the height of the upper floor assembly to the height of the lower floor assembly.

Figure 1C:
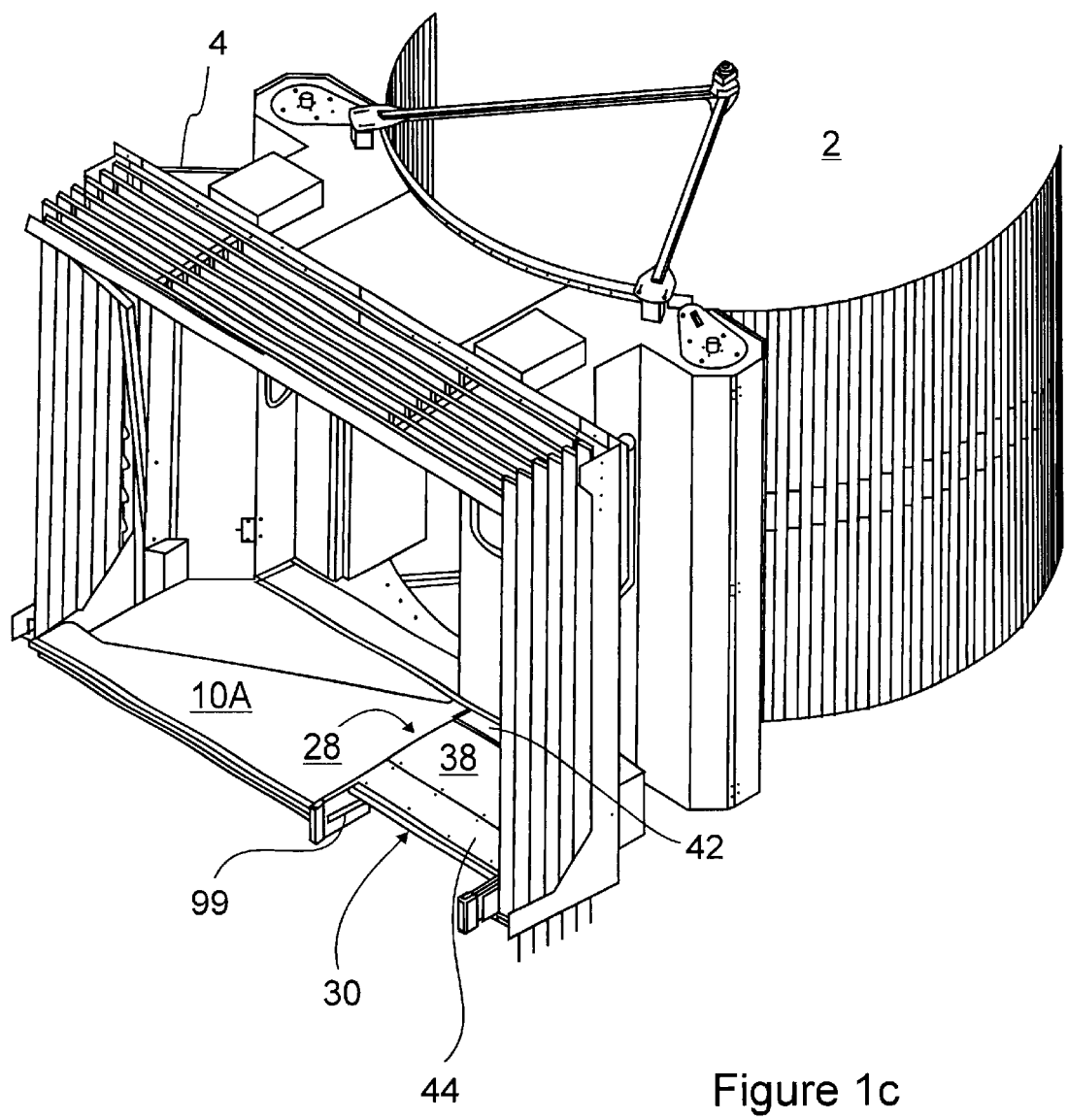
FIG. 1c is a partial elevated perspective view of a passenger boarding bridge fitted adjustable engagement assembly of the instant invention. The adjustable engagement assembly is shown in a commuter jet servicing condition.

Referring now to FIG. 1c, shown is a partial elevated perspective view of a passenger loading bridge fitted with the adjustable engagement assembly 28 of the instant invention. The adjustable engagement assembly 28 is shown in FIG. 1c in a commuter jet servicing condition. The upper floor assembly 30 is moved into a partially retracted position and the lower floor assembly 32 is moved into a fully retracted position. In FIG. 1c, the upper floor assembly obscures viewing of the lower floor assembly. In use, the door of the commuter aircraft is opened and the stairset is deployed prior to the passenger loading bridge 2 being mated to the fuselage of the commuter jet. The upper and lower floor assemblies are retracted by 11.25 inches and 21 inches, respectively, relative to the respective fully extended positions. Of courses, other retraction distances are envisaged for use with commuter jet stairsets having different dimensions and/or different handrail configurations. As illustrated in FIG. 1c, the rear edge of the heated sliding floor subassembly 38 is disposed adjacent to the leading edge of the pop up floor plate 42, but does not pass therebelow. Accordingly, the walking surface defined by the upper surfaces of the flip up door subassembly 44, the heated sliding floor subassembly 38 and the pop up floor plate 42 is substantially a level surface at approximately the same height as the cab floor portion 10A.

Next, the passenger loading bridge 2 is moved toward the aircraft such that the stairset is accommodated within the slot 22. The slot 22 is dimensioned such that the upper stair runner of the aircraft stairset is accommodated therein. Accordingly, in the illustrated embodiment the upper stair runner forms a portion of the embarkation platform used by passengers to move between the cab 4 and the aircraft. Sensing edges 99 arrest or reverse the motion of the bridge 2 if contact is made with the stairset. Optionally, the sensing edges 99 cause an alarm to be sounded in the event of contact.

In fact, the width of slot 22 exceeds the width of a typical commuter aircraft stairset, such that an opening is formed in the floor surface to either side of the upper stair runner. Each opening extends transversely between a side edge of the upper stair and an inner vertical surface of the slot 22, and longitudinally between the aircraft fuselage and the bumper along the leading edge of the flip up door subassembly 44. Optional handrails (not shown) are positionable proximate the aircraft doorway to provide a barrier for preventing passengers from falling through one of the openings adjacent the upper stair runner. Preferably, means are provided for covering the openings adjacent each side of the upper stair runner. For example, a generally planar panel (not shown) is positionable over the upper floor assembly 30 to form a walking surface between the cab 4 and the aircraft being serviced. Such a generally planar panel is dimensioned to extend longitudinally from a location within the aircraft to the upper floor assembly rearward the flip up door subassembly, and transversely to a portion of the cab floor beyond the openings. More preferably, auxiliary floor panels associated with the passenger loading bridge are provided, which can be slid or flipped from a stowed position into a second position for covering the openings when a commuter aircraft is being serviced. Advantageously, covering the openings with auxiliary floor panels provides improved fire protection to passengers and employees moving about within the cab 4.

Referring still to FIG. 1c, the function of the flip up door subassembly 44 will now be described in greater detail. The flip up door subassembly 44 serves as a portion of the walking surface that is used by passengers moving between the passenger boarding bridge and the aircraft being serviced. In addition, the flip up door subassembly functions as a safety mechanism for preventing damage to the aircraft. For example, when the upper floor assembly is in the partially retracted position, the leading edge of the flip up door subassembly 44 projects approximately 4.75 inches beyond the leading edge of the lower floor assembly. Accordingly, in the event that the aircraft shifts upward relative to the passenger loading bridge 2, for example during unloading of the aircraft, the flip up door subassembly will comes into contact with a component of the aircraft, such as for instance a handrail associated with the stairset. The flip up door subassembly 44 is hingedly mounted to the leading edge of the heated sliding floor subassembly 38, such that an upward force exerted near the leading edge of the flip up door subassembly will cause the flip up door subassembly to pivot upwards, thereby tripping switch 68. The switch 68 is connected to a control circuit (not shown) for optionally automatically adjusting the position of the bridge 2, arresting the motion of the bridge 2 or sounding an alarm. Advantageously, the flip up door subassembly 44 is of very lightweight construction, and therefore requires only a small force to be pivoted upwards and trip the switch 68. Such a small force is unlikely to result in damage to either the aircraft component or the adjustable engagement assembly.

Figure 11A:
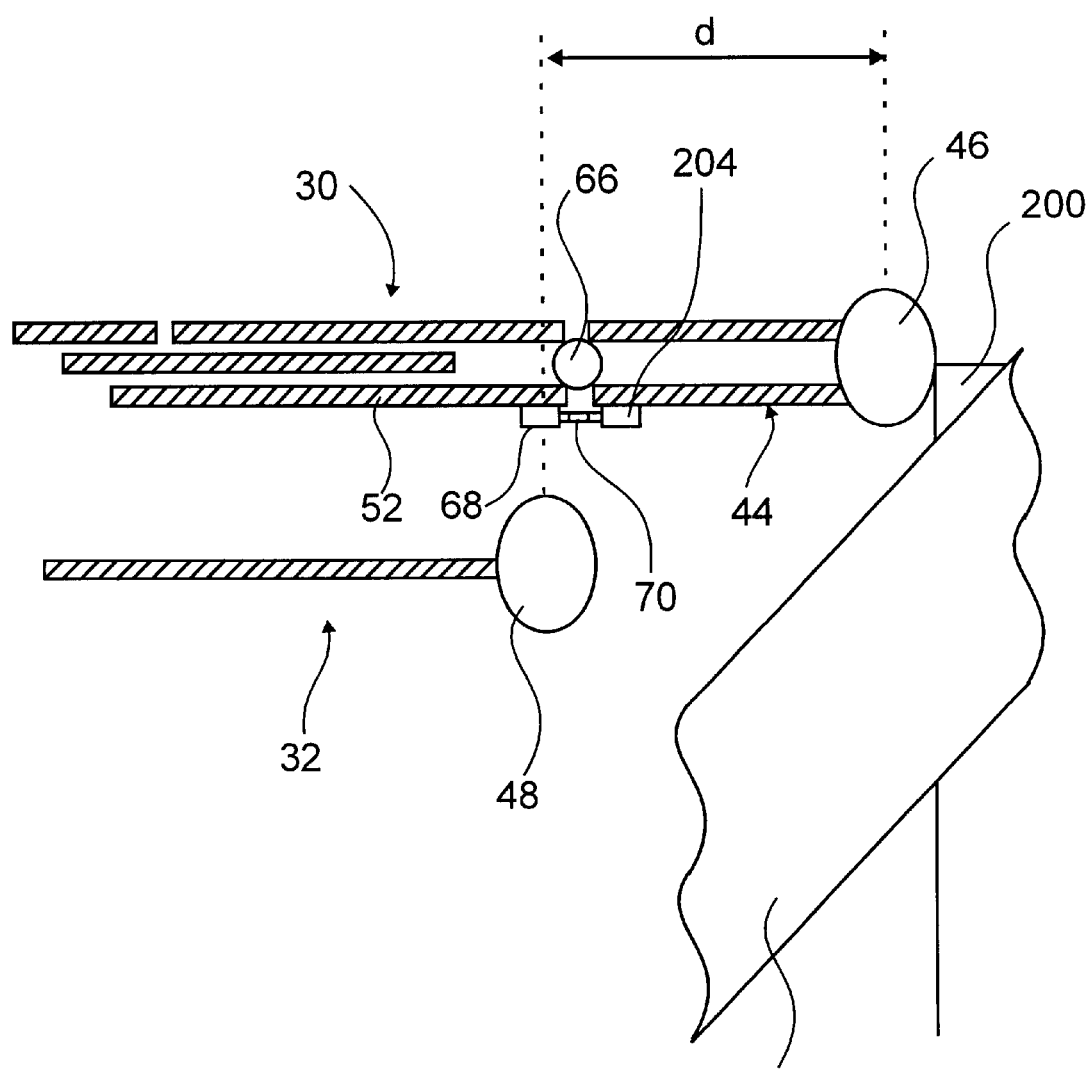
FIG. 11a is a partial side view of the adjustable engagement assembly mated against the upper stair riser of a commuter aircraft.
Figure 11B:
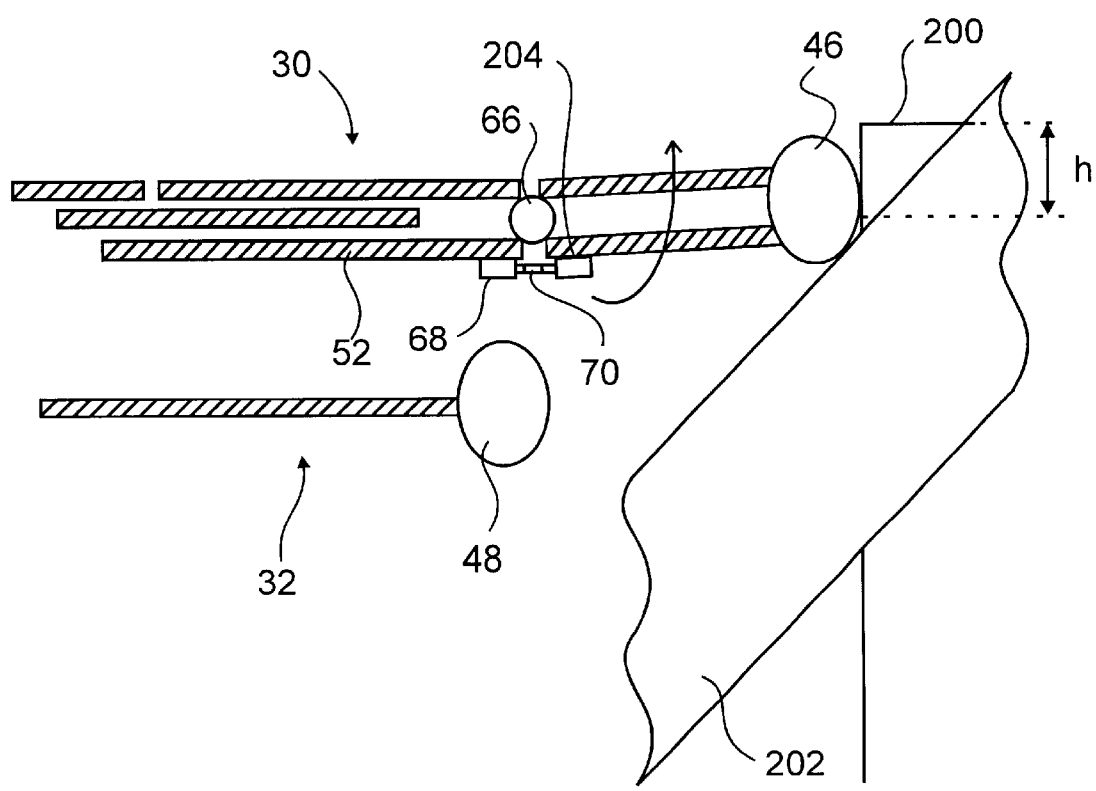
FIG. 11b is a partial side view of the adjustable engagement assembly of FIG. 11a in which the stairset handrail of the commuter aircraft has shifted upward relative to the adjustable engagement assembly.

Referring now to FIGS. 11a and 11b, shown is a side view of the upper floor assembly 30 including the flip up door subassembly 44 in a partially retracted position for engaging the step 200 of a commuter aircraft stairset. As is illustrated in FIG. 11a, the lower floor assembly is in a fully retracted position, wherein the bumper 48 is located a distance d rearward of the bumper 46. Advantageously, the bumper 48 is clear of the stairset handrail 202 when in the fully retracted position. Referring now to FIG. 11b, illustrated is the case wherein the aircraft has shifted upward by a distance h, for instance due to passengers leaving the aircraft, baggage being unloaded, etc. As shown in FIG. 11b, the aircraft stairset, including handrail 202, rises also by the amount h, bringing it into contact with the flip up door subassembly 44. The upward force exerted by the handrail 202 against the bumper at the leading edge of the flip up door subassembly causes the flip up door subassembly to pivot about the hinge, thereby moving a contact 204 associated with the flip up door subassembly 44 out of contact with the switch 68/adjustable bolt 70 components associated with the slide plate 52. Optionally, when contact is broken in this manner a signal is produced to cause the bridge to move away from the aircraft before damage can result. As shown in FIG. 11b, such a corrective action occurs before the lower floor assembly makes contact with the handrail 202. Further optionally, an alarm sounds to alert an operator that damage may result due to relative motion between the aircraft and the boarding bridge. Still further optionally, the broken contact results in all motion of the bridge relative to the aircraft being arrested, such as in the case when an operator is driving the bridge toward an aircraft and begins to make contact therewith.

Of course, as will be obvious to one of skill in the art, in the case of each example described with reference to FIGS. 1a and 1b, passengers move between the aircraft and the floor structure 10A. In contrast, for the example described with reference to FIG. 1c, passengers move between a commuter aircraft and the loading bridge by walking over at least a portion of the adjustable engagement assembly 28.

Figure 15:
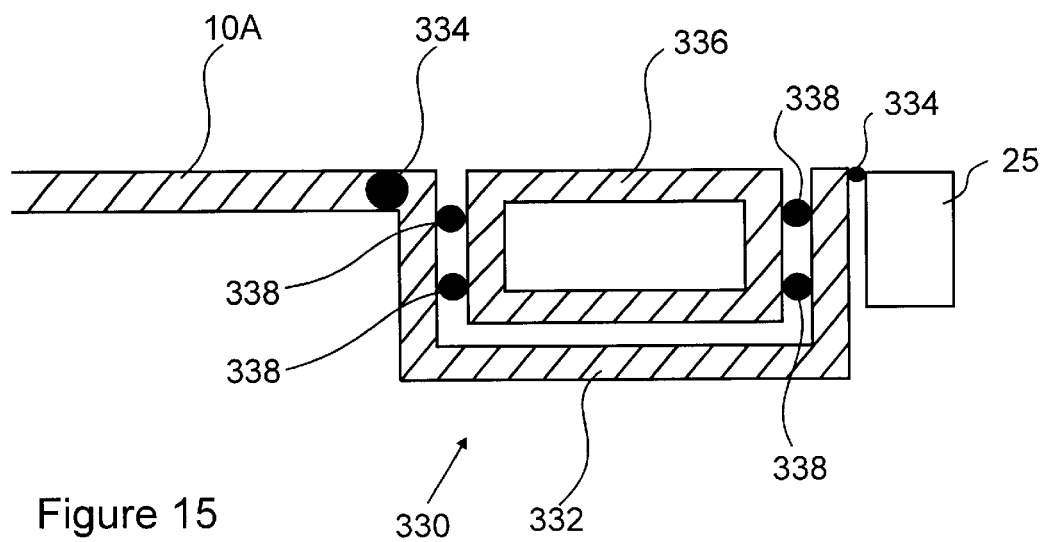
FIG. 15 is an end on view of an adjustable engagement assembly according to a second embodiment of the instant invention, taken along the aircraft engaging edge thereof.
Figure 16:
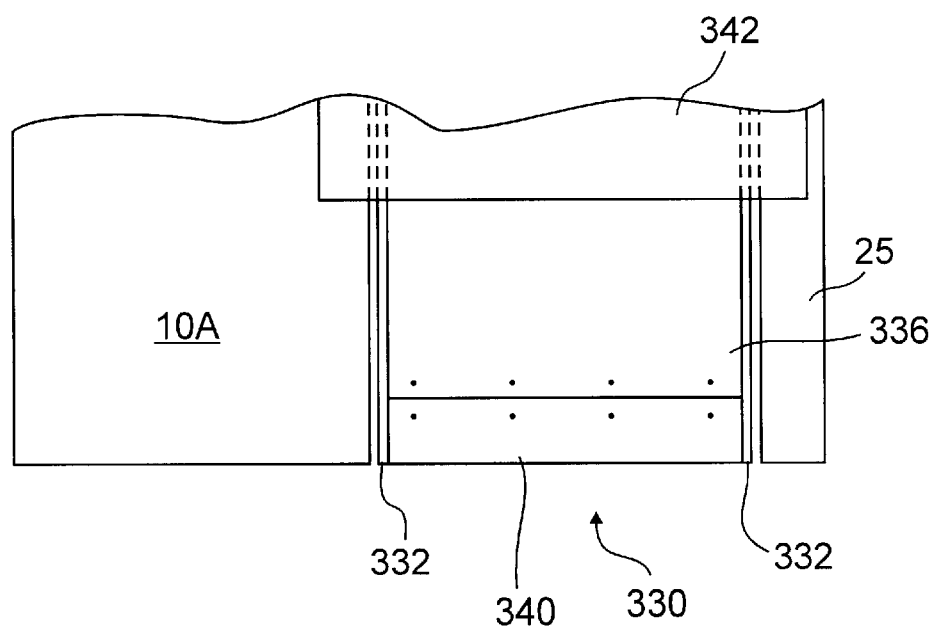
FIG. 16 is a partial top view of the adjustable engagement assembly of FIG. 15.
Figure 17:
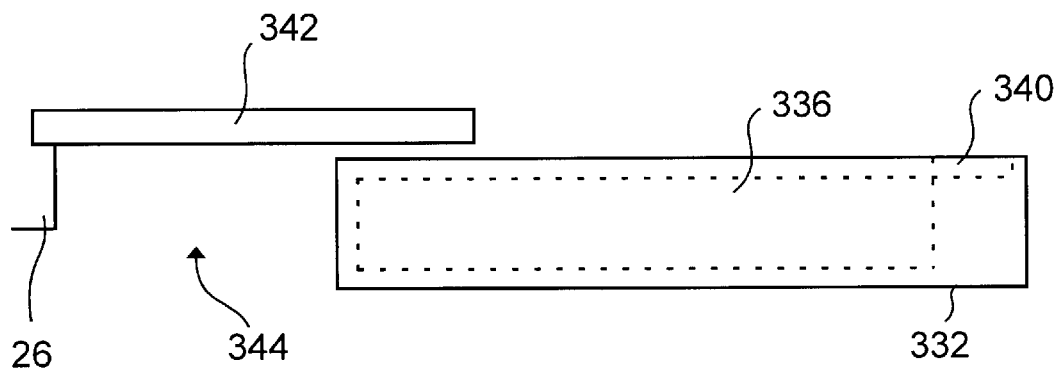
FIG. 17 is a partial side view of the adjustable engagement assembly of FIG. 15, taken along the left edge thereof.

Referring now to FIGS. 15–17, shown is a second embodiment of the instant invention. As shown in FIG. 15 and 16, the adjustable engagement assembly according to the second embodiment of the instant invention is for being disposed with a slot-like opening 330 of the first cab floor portion 10A. Bumper sections have been omitted for clarity. A lower floor member 332 in the form of a generally U-shaped structure is supported at opposite longitudinal edges thereof by guide tracks 334 or by other suitable means for supporting a sliding motion of the lower floor member 332 along a longitudinal direction within the slot 332. An upper floor member 336 is supported within the generally U-shaped channel formed by the lower floor member 332 within slot 330. The upper floor member 336 is illustrated in the instant embodiment as a generally rectangular box-like structure, however, other structures including a solid plate structure and a generally inverted U-shaped structure that is open along the bottom, are also envisaged. The upper floor member is supported by guide tracks 338 mounted along the lower floor member 332, for supporting an independent sliding motion of the upper floor member within the lower floor member 332. Optionally, the guide tracks 338 are mounted along opposite inner vertical surfaces of the lower floor member 332 (as illustrated), along the inner lower surface of the lower floor member 332, or some combination of both. The lower floor member 332 is dimensioned in a transverse direction to accommodate the door panel of a DC-9 type aircraft between the opposite inner vertical surfaces thereof. The lower floor member 332 is dimensioned in a vertical direction to accommodate the downward displacement of the DC-9 type aircraft door panel in the fully open position. Actuators (not shown) are provided for selectively retracting the upper floor member to a partially retracted position of 11.25 inches or a fully retracted position of 15 inches, and for retracting the lower floor member to a fully retracted position of 21 inches. A generally planar cover plate 342 is provided over a portion of the slot 330 adjacent the end plate 26. The cover plate 342 is for covering an open section 344 rearward of the upper and lower floor members, wherein actuators (not shown) are accommodated, and the upper and lower floor members are accommodated in their retracted and partially retracted positions.

As shown more clearly in FIGS. 16 and 17, the upper floor member optionally includes a flip up door assembly 340, similar to the flip up door subassembly 44 described previously. The flip up door assembly 340 functions in generally a same manner as the flip up door subassembly 44, and is optionally heated. Further optionally, the upper floor member 336 is a heated structure.

Numerous other embodiments may be envisaged without department from the spirit and scope of the invention.

What is claimed is:

1. An adjustable engagement assembly for use in a passenger loading bridge having a frame defining a slot-like opening in a cab floor portion thereof, the adjustable engagement assembly comprising:

an upper floor assembly for being disposed within the frame and defining a first floor surface at substantially a same height as the cab floor portion, the upper floor assembly including a first panel moveable between a first extended position in which the slot-like opening is substantially covered and a first retracted position in which a portion of the slot-like opening is exposed to define a notch at the height of the cab floor portion and along an aircraft engaging edge thereof;

a lower floor assembly for being disposed within the frame in a spaced-apart, stacked arrangement with the first panel and including a second panel defining a second floor surface at a height lower than the height of the cab floor portion, the second panel moveable between a second extended position toward the aircraft engaging edge of the cab floor portion and a second retracted position away from the aircraft engaging edge of the cab floor portion; and, a drive structure mechanically associated with the first panel and with the second panel, the drive structure for slidingly displacing the first panel between the first extended position and the first retracted position and for slidingly displacing the second panel between the second extended position and the second retracted position.

2. An adjustable engagement assembly according to claim 1, wherein the drive structure is adapted for a first mode of operation in which the first and second panels are both retracted simultaneously, and for a second mode of operation in which the second panel is extended while the first panel is other than extended.

3. An adjustable engagement assembly according to claim 1, wherein the drive structure includes a sector actuator.

4. An adjustable engagement assembly according to claim 1, wherein the drive structure includes an actuator selected from the group consisting of: a pneumatic piston and plunger actuator; a hydraulic piston and plunger actuator; and, an electromechanical screw actuator.

5. An adjustable engagement assembly according to claim 1, including a third panel hingedly mounted at a leading edge of the first panel, such that when a lower surface of the third panel contacts a portion of an aircraft being serviced by the passenger loading bridge, the third panel pivots upwardly absent substantial damage occurring to the aircraft.

6. An adjustable engagement assembly according to claim 5, wherein the third panel includes structure for affecting a temperature of the third panel.

7. An adjustable engagement assembly according to claim 1, wherein the lower floor assembly is disposed at a sufficient distance below the upper floor assembly to allow a door at the height of the first floor surface to pass above the second floor surface without making contact therewith, but generally insufficient to result in serious injury due to a fall from the height of the first floor surface to the height of the second floor surface.

8. An adjustable engagement assembly according to claim 7, wherein the sufficient distance is less than 12 inches.

9. An adjustable engagement assembly according to claim 8, wherein the sufficient distance is approximately 6 inches.

10. An adjustable engagement assembly according to claim 1, wherein the slot-like opening is dimensioned for accommodating a portion of a self-contained deployable stairset of a commuter aircraft therein.

11. An adjustable engagement assembly according to claim 10, including a sensing edge disposed within the slot-like opening along an inner vertical surface of the frame for sensing contact with the portion of a self-contained deployable stairset of a commuter aircraft.

12. An adjustable engagement assembly according to claim 1, wherein the first panel includes structure for affecting a temperature of the first panel.

13. An adjustable engagement assembly according to claim 1, including an upper guide track assembly disposed within the slot-like opening for supporting the first panel, such that the first panel is slidably displaceable within the upper guide track assembly between the first extended position and the first retracted position.

14. An adjustable engagement assembly according to claim 13, including a lower guide track assembly disposed elevationally below the upper guide track assembly within the slot-like opening, for supporting the second panel, such that the second panel is slidably displaceable within the lower guide track assembly between the second extended position and the second retracted position.

15. An adjustable engagement assembly according to claim 1, wherein the upper floor assembly includes a first limit switch for arresting the movement of the first panel at the first extended position and a second limit switch for arresting the movement of the first panel at the first retracted position.

16. An adjustable engagement assembly according to claim 15, wherein the upper floor assembly includes a third limit switch for arresting the movement of the first panel at a third retracted position intermediate the first extended position and the first retracted position.

17. An adjustable engagement assembly according to claim 16, wherein the third retracted position is selected for providing a substantially continuous walking surface between the first floor surface and a stair surface of a self-contained deployable stairset of a commuter aircraft.

* * * * *